US008845409B2

(12) United States Patent
Kane et al.

(10) Patent No.: US 8,845,409 B2
(45) Date of Patent: Sep. 30, 2014

(54) METHOD AND APPARATUS FOR REINVESTING WINNINGS

(75) Inventors: Steven N. Kane, Brookline, MA (US); Mark E. Herrmann, Wellesley, MA (US); Bijan Sabet, Sudbury, MA (US); Dow Hardy, Marlborough, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 1590 days.

(21) Appl. No.: 11/181,672

(22) Filed: Jul. 14, 2005

(65) Prior Publication Data

US 2006/0014579 A1 Jan. 19, 2006

Related U.S. Application Data

(63) Continuation-in-part of application No. 11/130,796, filed on May 16, 2005, which is a continuation-in-part of application No. 11/002,727, filed on Nov. 30, 2004.

(60) Provisional application No. 60/569,030, filed on May 7, 2004.

(51) Int. Cl.

| | |
|---|---|
| ***A63F 13/00*** | (2014.01) |
| ***G06F 17/00*** | (2006.01) |
| ***G07F 17/32*** | (2006.01) |
| ***G07F 17/34*** | (2006.01) |

(52) U.S. Cl.

CPC .......... *G07F 17/3267* (2013.01); *G07F 17/329* (2013.01); *G07F 17/32* (2013.01); *G07F 17/34* (2013.01); *G07F 17/3248* (2013.01)

USPC ................... 463/17; 463/16; 463/18; 463/19; 463/20; 463/25; 463/29; 463/42

(58) Field of Classification Search

USPC ................. 463/16–20, 25, 29, 42; 273/138.1, 273/138.2, 269, 143 R, 148 R

See application file for complete search history.

(56) References Cited

U.S. PATENT DOCUMENTS

| | | | |
|---|---|---|---|
| 2,544,961 | A | 3/1951 | Kemp |
| 4,215,864 | A | 8/1980 | Nichols |

(Continued)

FOREIGN PATENT DOCUMENTS

| | | |
|---|---|---|
| CA | 2338080 | 9/2001 |
| EP | 1746550 A2 | 1/2007 |

(Continued)

OTHER PUBLICATIONS

H.X. Mel and Doris Baker, Cryptography Decrypted, 2001 Addison Wesly, chapters 9 to 12.

(Continued)

*Primary Examiner* — Dmitry Suhol
*Assistant Examiner* — Andrew Kim
(74) *Attorney, Agent, or Firm* — Dority & Manning, P.A.

(57) ABSTRACT

A player is permitted to reinvest winnings to play additional instances of an online game. In one specific example, the player may choose, at a point of sale (POS), a reinvestment option that specifies how winnings are used to automatically purchase additional game instances. In one example game format, the player may be permitted to select a reinvestment option at the point of initial purchase of the game. The player may be permitted, for example, to limit his/her reinvestment as a function of their initial investment. In another example, the primary game result is driven by the result of a secondary game, such as a lottery or casino-based drawing (e.g., a Keno drawing). The secondary game is then played, and any additional plays as a result of the reinvestment are also played. Results of the secondary game and the additional games are sent to an online gaming system. The player is then permitted to play an online game to reveal the results of both the secondary game and any additional plays as a result of the reinvestment. In one example, the cost of the reinvestment is subtracted from any winnings as the additional plays are revealed to the player.

15 Claims, 10 Drawing Sheets

(56) References Cited

U.S. PATENT DOCUMENTS

| | | | |
|---|---|---|---|
| 4,494,197 | A | 1/1985 | Troy et al. |
| 4,582,324 | A | 4/1986 | Koza et al. |
| 4,679,789 | A | 7/1987 | Okada |
| 4,689,742 | A | 8/1987 | Troy et al. |
| 4,725,079 | A | 2/1988 | Koza et al. |
| 4,764,666 | A | 8/1988 | Bergeron |
| 4,856,787 | A | 8/1989 | Itkis |
| 4,882,473 | A | 11/1989 | Bergeron et al. |
| 4,922,522 | A | 5/1990 | Scanlon |
| 5,158,293 | A | 10/1992 | Mullins |
| 5,297,802 | A | 3/1994 | Pocock |
| 5,324,035 | A | 6/1994 | Morris |
| 5,333,868 | A | 8/1994 | Goldfarb |
| 5,351,970 | A | 10/1994 | Fioretti |
| 5,373,440 | A | 12/1994 | Cohen |
| 5,377,975 | A | 1/1995 | Clapper, Jr. |
| 5,398,932 | A | 3/1995 | Eberhardt et al. |
| 5,429,361 | A | 7/1995 | Raven |
| 5,445,391 | A | 8/1995 | Gleason, Jr. |
| 5,518,253 | A | 5/1996 | Pocock et al. |
| 5,569,082 | A | 10/1996 | Kaye |
| 5,586,937 | A | 12/1996 | Menashe |
| 5,611,729 | A | 3/1997 | Schumacher |
| 5,628,684 | A | 5/1997 | Bouedec |
| 5,645,485 | A | 7/1997 | Clapper, Jr. |
| 5,653,635 | A | 8/1997 | Breeding |
| 5,679,077 | A | 10/1997 | Pocock |
| 5,687,971 | A | 11/1997 | Khaladkar |
| 5,709,603 | A | 1/1998 | Kaye |
| 5,722,891 | A | 3/1998 | Inoue |
| 5,749,784 | A | 5/1998 | Clapper, Jr. |
| 5,768,382 | A | 6/1998 | Schneier et al. |
| 5,772,511 | A | 6/1998 | Smeltzer |
| 5,775,993 | A | 7/1998 | Fentz |
| 5,779,549 | A | 7/1998 | Walker |
| 5,782,470 | A | 7/1998 | Langan |
| 5,788,573 | A | 8/1998 | Baerlocher et al. |
| 5,791,990 | A | 8/1998 | Schroeder et al. |
| 5,791,991 | A | 8/1998 | Small |
| 5,797,795 | A | 8/1998 | Takemoto |
| 5,810,664 | A | 9/1998 | Clapper, Jr. |
| 5,816,918 | A | 10/1998 | Kelly et al. |
| 5,823,873 | A | 10/1998 | Moody |
| 5,823,874 | A | 10/1998 | Adams |
| 5,830,069 | A | 11/1998 | Soltesz et al. |
| 5,848,932 | A | 12/1998 | Adams |
| 5,857,911 | A | 1/1999 | Fioretti |
| 5,860,653 | A | 1/1999 | Jacobs |
| 5,871,398 | A | 2/1999 | Schneier |
| 5,882,258 | A | 3/1999 | Kelly et al. |
| 5,887,906 | A | 3/1999 | Sultan |
| 5,928,082 | A | 7/1999 | Clapper, Jr. et al. |
| 5,935,002 | A | 8/1999 | Falciglia |
| 5,944,606 | A | 8/1999 | Gerow |
| 5,954,582 | A | 9/1999 | Zach et al. |
| 5,980,385 | A | 11/1999 | Clapper |
| 5,996,997 | A | 12/1999 | Kamille |
| 6,007,426 | A | 12/1999 | Kelly et al. |
| 6,012,983 | A | 1/2000 | Walker et al. |
| 6,015,344 | A | 1/2000 | Kelly et al. |
| 6,024,640 | A | 2/2000 | Walker et al. |
| 6,028,920 | A | 2/2000 | Carson |
| 6,044,135 | A | 3/2000 | Katz |
| 6,048,269 | A | 4/2000 | Burns et al. |
| 6,056,289 | A | 5/2000 | Clapper |
| 6,059,289 | A | 5/2000 | Vancura |
| 6,077,163 | A | 6/2000 | Walker et al. |
| 6,106,393 | A | 8/2000 | Sunaga et al. |
| 6,113,495 | A | 9/2000 | Walker et al. |
| 6,146,272 | A | 11/2000 | Walker et al. |
| 6,152,823 | A | 11/2000 | Lacoste et al. |
| 6,159,097 | A | 12/2000 | Gura |
| 6,162,121 | A | 12/2000 | Morro et al. |
| 6,168,521 | B1 | 1/2001 | Luciano et al. |
| 6,173,267 | B1 | 1/2001 | Cairns |
| 6,179,711 | B1 | 1/2001 | Yoseloff |
| 6,186,892 | B1 | 2/2001 | Frank et al. |
| 6,193,608 | B1 | 2/2001 | Walker |
| 6,203,011 | B1 | 3/2001 | Nulph et al. |
| 6,203,427 | B1 | 3/2001 | Walker et al. |
| 6,222,486 | B1 | 4/2001 | Walker |
| 6,236,900 | B1 | 5/2001 | Geiger |
| 6,241,606 | B1 | 6/2001 | Riendeau et al. |
| 6,244,958 | B1 | 6/2001 | Acres et al. |
| 6,251,017 | B1 | 6/2001 | Leason et al. |
| 6,270,406 | B1 | 8/2001 | Sultan |
| 6,273,817 | B1 | 8/2001 | Sultan |
| 6,279,911 | B1 | 8/2001 | Cherry |
| 6,280,325 | B1 | 8/2001 | Fisk |
| RE37,371 | E | 9/2001 | Gerow |
| 6,283,855 | B1 | 9/2001 | Bingham |
| 6,287,197 | B1 | 9/2001 | Dickinson |
| 6,302,793 | B1 | 10/2001 | Fertitta et al. |
| 6,309,298 | B1 | 10/2001 | Gerow |
| 6,311,976 | B1 | 11/2001 | Yoseloff et al. |
| 6,312,334 | B1 | 11/2001 | Yoseloff |
| 6,358,151 | B1 | 3/2002 | Enzminger et al. |
| 6,364,765 | B1 | 4/2002 | Walker et al. |
| 6,364,766 | B1 | 4/2002 | Anderson |
| 6,368,214 | B1 | 4/2002 | Luciano |
| 6,368,218 | B2 | 4/2002 | Angell, Jr. |
| 6,371,852 | B1 | 4/2002 | Acres |
| 6,375,567 | B1 | 4/2002 | Acres |
| 6,390,921 | B1 | 5/2002 | Busch et al. |
| 6,394,902 | B1 | 5/2002 | Glavich et al. |
| 6,402,614 | B1 | 6/2002 | Schneier et al. |
| 6,439,995 | B1 | 8/2002 | Hughs-Baird |
| 6,471,208 | B2 | 10/2002 | Yoseloff et al. |
| 6,488,280 | B1 | 12/2002 | Katz et al. |
| 6,514,144 | B2 | 2/2003 | Riendeau et al. |
| 6,523,829 | B1 | 2/2003 | Walker et al. |
| 6,527,175 | B1 | 3/2003 | Dietz |
| 6,540,230 | B1 | 4/2003 | Walker et al. |
| 6,565,084 | B1 | 5/2003 | Katz et al. |
| 6,572,106 | B2 | 6/2003 | Alexoff et al. |
| 6,572,107 | B1 | 6/2003 | Walker et al. |
| 6,575,832 | B1 | 6/2003 | Manfredi et al. |
| 6,582,307 | B2 | 6/2003 | Webb |
| 6,582,310 | B1 | 6/2003 | Walker et al. |
| 6,585,590 | B2 | 7/2003 | Malone |
| 6,588,747 | B1 | 7/2003 | Seelig |
| 6,595,854 | B2 | 7/2003 | Hughs-Baird |
| 6,599,187 | B2 | 7/2003 | Gerow |
| 6,599,192 | B1 | 7/2003 | Baerlocher et al. |
| 6,607,439 | B2 | 8/2003 | Schneier et al. |
| 6,612,501 | B1 | 9/2003 | Woll et al. |
| 6,612,574 | B1 | 9/2003 | Cole et al. |
| 6,619,660 | B2 | 9/2003 | Schaefer et al. |
| 6,620,046 | B2 | 9/2003 | Rowe |
| 6,625,578 | B2 | 9/2003 | Spaur et al. |
| 6,645,074 | B2 | 11/2003 | Thomas et al. |
| 6,645,075 | B1 | 11/2003 | Gatto |
| 6,656,042 | B2 | 12/2003 | Reiss et al. |
| 6,663,105 | B1 | 12/2003 | Sullivan et al. |
| 6,676,126 | B1 | 1/2004 | Walker et al. |
| 6,679,497 | B2 | 1/2004 | Walker et al. |
| 6,681,995 | B2 | 1/2004 | Sukeda et al. |
| 6,682,419 | B2 | 1/2004 | Webb et al. |
| D486,869 | S | 2/2004 | Webb et al. |
| 6,685,561 | B2 | 2/2004 | Anderson et al. |
| 6,692,353 | B2 | 2/2004 | Walker et al. |
| 6,705,944 | B2 | 3/2004 | Luciano |
| 6,716,103 | B1 | 4/2004 | Eck et al. |
| 6,719,631 | B1 | 4/2004 | Tulley et al. |
| 6,729,956 | B2 | 5/2004 | Wolf et al. |
| 6,733,385 | B1 | 5/2004 | Enzminger et al. |
| 6,736,324 | B2 | 5/2004 | Behm |
| 6,749,198 | B2 | 6/2004 | Katz et al. |
| 6,761,633 | B2 | 7/2004 | Riendeau et al. |
| 6,780,108 | B1 | 8/2004 | Luciano |
| 6,786,824 | B2 | 9/2004 | Cannon |
| 6,811,484 | B2 | 11/2004 | Katz et al. |
| 6,824,467 | B2 | 11/2004 | Schlottmann et al. |
| 6,843,724 | B2 | 1/2005 | Walker et al. |

(56) References Cited

U.S. PATENT DOCUMENTS 6,852,031 B1 2/2005 Rowe et al.
6,855,052 B2 2/2005 Weiss et al.
6,866,584 B2 3/2005 Michaelson
6,896,619 B2 5/2005 Baltz
6,899,622 B2 5/2005 Lind et al.
6,910,968 B2 6/2005 Nassef et al.
6,913,534 B2 7/2005 DeFrees-Parrott
6,918,589 B2 7/2005 Thibault
6,929,544 B2 8/2005 Osterer
6,934,846 B2 8/2005 Szrek
6,942,570 B2 9/2005 Schneier et al.
6,969,319 B2 11/2005 Rowe et al.
7,008,317 B2 3/2006 Cote et al.
7,008,318 B2 3/2006 Schneier et al.
7,024,375 B2 4/2006 Chau
7,052,394 B2 5/2006 Walker et al.
7,073,720 B2 7/2006 Behm
7,094,149 B2 8/2006 Walker
7,112,135 B2 9/2006 Anderson
7,118,478 B2 10/2006 Fayter et al.
7,163,459 B2 1/2007 Tanskanen et al.
7,172,506 B2 2/2007 Baerlocher et al.
7,179,168 B1 2/2007 Tulley et al.
7,186,180 B2 3/2007 Lathrop
7,213,811 B2 5/2007 Bozeman
7,241,219 B2 7/2007 Walker
7,275,990 B2 10/2007 Walker et al.
7,285,045 B2 10/2007 Schneier et al.
7,294,058 B1 11/2007 Slomiany et al.
7,303,468 B2 12/2007 Schneier et al.
7,303,470 B2 12/2007 George et al.
7,311,599 B2 12/2007 Knapp
7,357,393 B2 4/2008 Finocchio
7,416,484 B1 8/2008 Nelson
7,490,830 B2 2/2009 Mirandette
2001/0034635 A1 10/2001 Winters
2001/0046891 A1 11/2001 Acres
2001/0049305 A1 12/2001 Riendeau et al.
2002/0010015 A1 1/2002 Acres
2002/0013167 A1 1/2002 Spaur et al.
2002/0039923 A1 4/2002 Cannon et al.
2002/0042300 A2 4/2002 Acres et al.
2002/0052229 A1 5/2002 Halliburton et al.
2002/0061778 A1 5/2002 Acres
2002/0077173 A1 6/2002 Luciano et al.
2002/0090986 A1* 7/2002 Cote et al. ........................ 463/16
2002/0090987 A1 7/2002 Walker et al.
2002/0093190 A1 7/2002 Katz
2002/0094860 A1 7/2002 Itkis
2002/0098882 A1 7/2002 Lind et al.
2002/0107072 A1 8/2002 Giobbi et al.
2002/0111207 A1 8/2002 Lind
2002/0147040 A1 10/2002 Walker et al.
2002/0152120 A1 10/2002 Howington et al.
2002/0155885 A1 10/2002 Shvili
2002/0169018 A1 11/2002 Schneier et al.
2002/0187827 A1 12/2002 Blankstein
2002/0193158 A1 12/2002 Weiss et al.
2002/0198038 A1 12/2002 Adams
2003/0013531 A1 1/2003 Rowe et al.
2003/0027628 A1 2/2003 Luciano
2003/0032473 A1 2/2003 Rowe et al.
2003/0032476 A1 2/2003 Walker et al.
2003/0045340 A1 3/2003 Roberts
2003/0047869 A1 3/2003 Walker et al.
2003/0060257 A1 3/2003 Katz et al.
2003/0060261 A1 3/2003 Katz et al.
2003/0069068 A1 4/2003 Kaminkow
2003/0080507 A1* 5/2003 Higginson .................... 273/269
2003/0080508 A1 5/2003 Thibault
2003/0102625 A1 6/2003 Katz et al.
2003/0114217 A1 6/2003 Walker et al.
2003/0119581 A1 6/2003 Cannon et al.
2003/0139214 A1 7/2003 Wolf et al.
2003/0155715 A1 8/2003 Walker et al.
2003/0157977 A1 8/2003 Thomas et al.
2003/0171986 A1 9/2003 Itkis
2003/0176210 A1 9/2003 Vancura et al.
2003/0176212 A1 9/2003 Schlottmann et al.
2003/0184012 A1 10/2003 Green
2003/0186739 A1 10/2003 Paulsen et al.
2003/0195841 A1 10/2003 Ginsberg et al.
2003/0199302 A1* 10/2003 Weiss .............................. 463/17
2003/0199318 A1 10/2003 Nassef et al.
2003/0218303 A1 11/2003 Walker et al.
2003/0220138 A1 11/2003 Walker et al.
2004/0025190 A1 2/2004 McCalla et al.
2004/0036212 A1 2/2004 Walker et al.
2004/0038723 A1 2/2004 Schneier et al.
2004/0051240 A1 3/2004 Adams
2004/0053683 A1 3/2004 Hartl et al.
2004/0059445 A1 3/2004 Moore
2004/0063484 A1 4/2004 Dreaper et al.
2004/0092307 A1 5/2004 George et al.
2004/0102238 A1 5/2004 Taylor
2004/0102239 A1 5/2004 Samila
2004/0127279 A1 7/2004 Gatto et al.
2004/0133472 A1 7/2004 Leason et al.
2004/0142741 A1 7/2004 Walker et al.
2004/0147308 A1 7/2004 Walker et al.
2004/0152504 A1 8/2004 Herrmann et al.
2004/0152510 A1 8/2004 Herrmann
2004/0180722 A1 9/2004 Giobbi et al.
2004/0185930 A1 9/2004 Thomas et al.
2004/0204222 A1 10/2004 Roberts
2004/0214628 A1 10/2004 Boyd et al.
2004/0229671 A1 11/2004 Stronach et al.
2004/0229677 A1 11/2004 Gray
2004/0259629 A1 12/2004 Michaelson et al.
2004/0259631 A1 12/2004 Katz et al.
2005/0037841 A1 2/2005 de Waal
2005/0049042 A1 3/2005 Walker et al.
2005/0075158 A1 4/2005 Walker et al.
2005/0090314 A1 4/2005 Nassef, Jr. et al.
2005/0092839 A1 5/2005 Oram
2005/0124407 A1 6/2005 Rowe et al.
2005/0164779 A1 7/2005 Okuniewicz
2005/0170881 A1 8/2005 Muskin
2005/0176495 A1* 8/2005 Stronach ......................... 463/25
2005/0187005 A1 8/2005 Rose et al.
2005/0258596 A1 11/2005 Such
2005/0282619 A1 12/2005 Vancura et al.
2005/0282626 A1 12/2005 Manfredi et al.
2005/0288088 A1 12/2005 Englman et al.
2006/0025219 A1 2/2006 Nassef, Jr. et al.
2006/0035696 A1 2/2006 Walker et al.
2006/0036450 A1 2/2006 Nassef, Jr. et al.
2006/0041586 A1 2/2006 Nassef, Jr. et al.
2006/0068893 A1 3/2006 Jaffe et al.
2006/0073884 A1 4/2006 Walker et al.
2006/0089194 A1 4/2006 Joshi et al.
2006/0148562 A1 7/2006 Walker et al.
2006/0194631 A1 8/2006 Rowe et al.
2006/0205511 A1 9/2006 Thomas et al.
2006/0247035 A1 11/2006 Rowe et al.
2007/0054729 A1 3/2007 Hornik et al.
2007/0060261 A1 3/2007 Gomez et al.
2007/0060274 A1 3/2007 Rowe et al.
2007/0060317 A1 3/2007 Martin et al.
2007/0060329 A1 3/2007 Martin et al.
2007/0060330 A1 3/2007 Martin et al.
2007/0060331 A1 3/2007 Martin et al.
2007/0060369 A1 3/2007 Martin et al.
2007/0087834 A1 4/2007 Moser et al.
2007/0167216 A1 7/2007 Walker et al.
2007/0173322 A1 7/2007 Swamy et al.
2007/0265062 A1 11/2007 Thomas et al.
2008/0032763 A1 2/2008 Giobbi et al.
2008/0039171 A1 2/2008 Slomiany et al.

(56) References Cited

U.S. PATENT DOCUMENTS

| | | | |
|---|---|---|---|
| 2008/0039173 | A1 | 2/2008 | Walther et al. |
| 2008/0287176 | A1 | 11/2008 | Bennett |

FOREIGN PATENT DOCUMENTS

| | | | |
|---|---|---|---|
| EP | 1762990 | A2 | 3/2007 |
| EP | 1833014 | A1 | 9/2007 |
| WO | WO 91/06931 | | 5/1991 |
| WO | WO 97/37737 | | 10/1997 |
| WO | WO 99/10057 | | 3/1999 |
| WO | WO 99/16519 | | 4/1999 |
| WO | WO 00/43087 | | 7/2000 |
| WO | WO 00/69535 | | 11/2000 |
| WO | WO 01/14029 | | 3/2001 |
| WO | WO 03/004118 | | 1/2003 |
| WO | WO 03/061795 | | 7/2003 |
| WO | WO 03/084625 | | 10/2003 |
| WO | WO 03/089077 | | 10/2003 |
| WO | WO 03/089082 | | 10/2003 |
| WO | WO 2004/013820 | | 2/2004 |
| WO | 2004/105902 | | 9/2004 |
| WO | WO 2004/114073 | | 12/2004 |
| WO | WO 2005/029279 | | 3/2005 |
| WO | WO 2005/031666 | | 4/2005 |
| WO | WO 2005/079242 | | 9/2005 |
| WO | WO 2006/028820 | | 3/2006 |
| WO | WO 2006/052469 | | 5/2006 |
| WO | WO 2007/035618 | | 3/2007 |
| WO | WO 2007/040707 | | 4/2007 |
| WO | WO 2007/076321 | | 7/2007 |
| WO | WO 2007/145999 | | 12/2007 |
| WO | WO 2008/014334 | | 1/2008 |
| WO | WO 2008/022083 | | 2/2008 |
| WO | WO 2008/022084 | | 2/2008 |

OTHER PUBLICATIONS

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel_of_Fortune_%28US_game_show%29>.

New Jersey, State of, "Wheel of Fortune" New Jersey Lottery, Nov. 13, 2007 <http://www.state.nj.us/lottery/instant/ig409.htm>.

New Jersey, State of, "Lots O' Spots Bingo" New Jersey Lottery, Dec. 6, 2007 <http://www.state.nj.us/lottery/instant/ig340.htm>.

Rules of Pai Gow Poker. Casino City. Dec. 3, 2000. Online: http://web.archive.org/web/20001203170300/http://www.casinocity.com/rules/paigow.htm.

http://www.powerball.com/powerball/pb_howtoplay.asp, accessed Sep. 14, 2008, All.

Written opinion of the international searching authority (international application No. PCT/US07/76224).

Examiner's first report on patent application No. 2003298941.

Bejeweled Deluxe, Version 1.87, Developed and published by PopCap Games, Inc., www.popcap.com, http://www.popcap.com/faq/bejeweled/1033/pc/readme.html (1 of 8) Feb. 25, 2010 9:14:22 AM.

David, Matthew, Online Games Development in Flash—A Brief History, Apr. 28, 2003, SitePoint, http://articles.sitepoint.com/printlflash-brief-history (1 of 6) Jun. 18, 2010 8:28:50 AM.

* cited by examiner

METHOD AND APPARATUS FOR REINVESTING WINNINGS

RELATED APPLICATIONS

This application is a continuation-in-part of U.S. patent application Ser. No. 11/130,796, entitled "METHOD AND APPARATUS FOR CONDUCTING A GAME OF CHANCE," filed on May 16, 2005, which is a continuation-in-part of U.S. patent application Ser. No. 11/002,727, entitled "METHOD AND APPARATUS FOR CONDUCTING A GAME OF CHANCE," filed on Nov. 30, 2004 which claims the benefit under 35 U.S.C. §119(e) to U.S. Provisional Application Ser. No. 60/569,030, entitled "METHOD AND APPARATUS FOR CONDUCTING A GAME OF CHANCE," filed on May 7, 2004, each of which applications are herein incorporated by reference by their entirety.

FIELD OF THE INVENTION

The field of the invention relates generally to lotteries and gaming, and more particularly, to systems for conducting lottery-based games or casino-based gaming.

BACKGROUND

There are many different types of games that are provided that involve the issuance of a lottery ticket to play a game of chance. Lottery tickets are sold through retailers using machines referred to as point of sale (POS) terminals. These tickets are generally printed at the POS terminal, and are usually issued for some lottery drawing to be performed at a later time. Examples of these types of lottery games of chance include traditional state lottery drawings and multi-state lottery drawings (e.g., PowerBall). Another type of lottery ticket, referred to in the art as instant lottery, includes a pre-printed scratch-type lottery ticket which includes a latex or similar coating that is scratched off by a purchaser (a player), revealing one or more game indicia and whether the player won the game or series of games as indicated on the ticket. The indication is generally "instant" in that the player knows, when they scratch off the ticket coating, whether or not they won the game.

There are many online games that can be played using a computer system coupled to a communication network (e.g., the Internet). These games may include traditional games of chance, games of skill, and casino-type games, among others.

Some systems combine lottery-type games and online games. In one such system, a lottery ticket is sold to a player, who then plays a further game using a computer system. In such a game system, the ticket sold to a player includes a code which is correlated to a game seed stored in a computer system upon which a computer game is played. The computer game determines the correlated game seed, and this game seed is mapped to a series of predetermined game states that lead to a predetermined outcome. That is, the code stored on the ticket includes the outcome. In another type of system, the code stored on the ticket is an encoded form of the lottery result, which is then revealed to the player at the end of play of an online game.

SUMMARY OF THE INVENTION

According to one aspect of the present invention, it is realized that it may be beneficial to increase current and return interest of players in playing games. In one aspect of the present invention, it may be beneficial to offer a player the ability to reinvest their winnings in order to obtain additional chances of winning a game, and therefore, to provide a game operator additional opportunities to generate further revenue. However, there are, in many states, there are requirements that a player not purchase games and/or redeem the winnings outside of a legal jurisdiction such as a casino. Thus, players are restricted in purchasing and redeeming winnings within the legal jurisdiction (e.g., in the casino). There is a problem, therefore, with a player redeeming winnings by reinvesting the winnings in one or more additional plays of a game in that the player is restricted to purchasing the additional plays (and redeeming the winnings) inside of the legal jurisdiction. One aspect of the present invention relates to a more convenient method for reinvesting winnings in additional game plays.

According to one embodiment of the present invention, a reinvestment option is presented to the player when the player initially purchases one or more games of chance. In particular, the reinvestment option permits the winnings of one or more of the games of chance to be used to purchase additional chances in one or more games. These additional chances may be, for example, in a current game being played. In one example, additional opportunities to win may be awarded in the currently-played game, and purchased with winnings. In another example, winnings are used to purchase additional opportunities to win in a later-played game.

According to one embodiment, the reinvestment may be selected by the player at the point when the game is purchased, thus eliminating the legal issue of reinvesting winnings outside of the legal gaming jurisdiction. In one example, a player designates a reinvestment option at a Point of Sale (POS) of a game ticket purchasing one or more games of chance. The ticket may be, for example, a scratch ticket, pull-tab ticket or any other type of ticket.

In one example game format, it may be desired to implement a limit on the reinvestment option, as an unlimited reinvestment will eventually cause the player to lose all of the player's winnings. In one specific game format, there may be one or more reinvestment options that limit the amount of reinvestment of winnings. For instance, reinvestment may be determined as a function of the amount of the original investment (e.g., 2× the original investment). However, reinvestment may be limited by any qualification, such as, for example, a monetary limit, number of tickets, or any other parameter. In a further option, the player may choose to disable the reinvestment option after the reinvestment option is designated (e.g., prior to or during play of the game) to further limit the amount of winnings reinvested. Further, the disabling of the reinvestment option may occur outside of the legal gaming jurisdiction.

Reinvestment may occur, for example, when winnings are made available (e.g., when the player wins a game). Reinvestment may also occur when the current game plays are exhausted. The act of performing the reinvestment and revealing additional win opportunities may be presented to the player via a computer system. In one such example, the player plays a computer-based game (referred to hereinafter as a "primary" game) to reveal the results of another game (referred to herein as a "secondary" game) such as, for example, a casino or lottery-based game. In one specific example, the secondary game is a Keno-based game.

According to another aspect of the present invention, it is appreciated that new and more interesting game formats are needed for lottery and casino type games that keep players' interest and therefore result in continued and/or return players. According to one embodiment of the present invention, it is appreciated there is a great deal of effort and expense to introduce additional games, especially in the casino area. In particular, as each game is introduced, its features are scrutinized by regulators prior to introduction. It therefore would be beneficial to be able to reduce the regulatory effort in introducing new games that are exciting to players to play. To this end, according to one aspect of the present invention, a system is provided having two games, one of which is already approved by regulators whose outcomes are used to drive outcomes of another game. Because the outcome determination and odds of winning the other game are driven by a previously-approved game, the regulatory hurdles associated with releasing the other game are reduced.

As discussed, in one aspect of the present invention, the player is permitted to play a computer-based game (the "primary" game) during which the game playing system reveals results of another game (the "secondary" game). This secondary game may be a casino or lottery-based game and, according to one embodiment, this secondary game is already approved by regulators. One such game is the well-known game of Keno. However, it should be appreciated that the secondary game may be any other type of game (e.g., a lottery game). The primary game may be any type of computer-based game, including games of skill and/or chance, such as card games, casino games, video games or any other type of game through which a result from another game may be revealed. In one aspect of the present invention, the play of the primary game that the player plays does not affect the outcome of the secondary game. In another aspect of the present invention, the secondary game result does not affect the outcome of the primary game played by the player.

In one example, the primary game involves some level of influence by the player on the outcome of the primary game. For instance, the primary game may be a game of skill. However, it should be appreciated that the primary game be a game based on chance, or combination of skill and chance. In one example, the primary game may be a card game. The player may be permitted to play a slot machine game (or other type of game), during which the result of the primary game is revealed over one or more instances of the game.

According to one aspect of the present invention, the slot machine game is combined with a second level game. Play of the second level game may proceed after some achievement level in the slot machine game. For instance, the player may play the slot machine game as discussed above, and in one embodiment, the second level may proceed after the player successfully plays a series of instances of the slot machine game. Alternatively, the player may play the slot machine game until completion, and at an ending of the slot machine game (e.g., the player quits, uses a control to automatically play the slot machine game, etc.), the player begins playing the second level game.

According to one aspect of the present invention, the result of the primary game is stored on a server coupled to a computer system upon which the game is played. In one example, the result is downloaded to the computer system prior to game play. The result may be in the form of intermediate results of each game instance that are displayed to the player at various points during game play. For instance, intermediate results may be displayed to a user during an instance of a slot machine game. For example, intermediate results may be shown to a player when a particular spin is revealed, a particular outcome is achieved (e.g., the player obtains a particular reel combination) or other achievement during the play of a slot machine game.

In one embodiment of the present invention, the traditional game of poker or similar game is coupled with a second level game. Further, during the play of the poker game, one or more items are awarded to the player for use in the second level game. For instance, items are awarded when the poker game is played. In the example of the poker game, there may be an indication in a pay table that one or more card combinations provide the player with one or more items (e.g., item(s) that may be used with a second level game). For instance, the second level game may be a slot machine-type game, and one or more spins may be awarded to the player during play of the first level game. In one embodiment, a pay table is provided that correlates poker hands with a number of spins awarded to the player. In another example, a pay table is provided that correlates poker hands with a number of points awarded to the player. If the player achieves a particular point total, that player may receive an item for use in the second level game.

The player may, in the first level game, accrue more than one item. In yet another example, if the player achieves a particular point value, the second level game may be initiated. In any of the examples, the player may or may not achieve the second level game. Of course, if the player is determined prior to play as receiving a prize, results received in the first level game may be adjusted so that the player proceeds to the second level game independent of the skill (or lack thereof) in playing the first level game. In one example, the player may begin game play of the first level with one item awarded to ensure that the player proceeds to the second level game.

In one embodiment of the present invention, a poker game played in a first level game is combined with a slot machine game played in a second level game. The player, in one example, collects one or more spins to be used in the slot machine game. As discussed, the player may be awarded one or more spins based on his/her play of the poker game. As the odds of winning the game of poker are at least in part, based on the skill of the player, the number of spins collected by any one player may vary according to the game played. The game program may adjust the results in the second level game according to the number of spins earned in the first level game. According to one aspect of the invention, the number of spins awarded to the player may be "fixed", and therefore, the results of the poker game may be adjusted to yield particular outcomes. These outcomes may be adjusted depending on the game play by the player. In another example, the player may begin play in the first level game with one spin awarded to ensure that the player proceeds to the slot machine game.

Alternatively, items may be awarded with corresponding elements (e.g., a card associated with the first level game). This indication may be, for example, a graphical, textual, or other symbolic indication that the element contains an item. In one example, this indication may be the same or similar element used to indicate that there is a hidden item associated with the element. The type of hidden item may not, according to one embodiment, be known by the user until the hidden item is revealed during game play. In one example, when a card is drawn having the hidden item, the game program displays the hidden item to the player. The hidden item may be, for example, an item that is used to reveal prizes in a second-level game (e.g., a spin). Alternatively, the player may be awarded a prize (or not) with the revealing of each hidden item.

In another example, the first level game may contain more than one hidden item, and these items may be collected by the player as hidden items are revealed. When the game has ended, the player may use the one or more collected items in the second level game. In one example game, the items revealed during the game of poker are used to open hidden items in a second level game. For instance, the second level game includes a series of boxes (or other element type) which are opened (and their hidden items revealed) with items collected during the play of the poker game. However, it should be appreciated that the items may be any type of item that can be used in a second level game. In another example, the player may be presented a finite number of chances to open prize boxes that may reveal one or more prizes.

Prizes awarded during the second level of play may be, for example, a cash prize awarded for a particular game. It should be appreciated, however, that other prizes may be awarded (e.g., merchandise, credit, free play, etc.) and that the invention is not limited to any particular prize type.

According to one aspect of the present invention, prizes revealed during the second level game may be stored in a database of the server and downloaded to the client prior to play. In this example, the player may be allowed, when a ticket is purchased at a POS, the ability to play a number of instances of the game. Prizes may be awarded, for example, at each instance of the second level of the online game. To this end, the result of each prize may be stored in the database of the server, and may be indexed by an identifier of the ticket. For example, the identifier may be a serial number or other ticket-identifying information.

According to one aspect of the present invention, prizes are only awarded in the second level game. In another example, after a prize is revealed (or not) in the second level game, the player is permitted to play any remaining instances of the primary game (e.g., a slot-machine type game or poker game). According to another embodiment, the player may not be permitted to replay game instances after they have been played. To this end, a game-playing system may maintain a status of the game instances played by the player. The game-playing system may maintain other information, such as game play information, how prizes are revealed to the player, and other information that may be useful for assessing or auditing game play and playing experiences of the player.

Each instance of the game may include an associated prize (or not), and these prizes may be combined for an overall prize associated with the ticket. In one example, the prize associated with the first instance of the poker game and its second level is $10.

Each instance of the game may include an associated prize (or not), and these prizes may be combined for an overall prize associated with the ticket. In one example, the prize associated with the first instance of the poker game and its second level is $10. A prize associated with a second instance of the poker game and its second level is $15. The prizes associated with each instance of the poker game and its second level may be stored as an entry in the database of the server.

In an alternative embodiment, there is one instance of the poker game, wherein there are multiple win opportunities within the single instance. For example, in a single game, there may be win opportunities associated with certain letter spins of the slot machine game. When a spin associated with one of the win opportunities is performed, a prize may be (or not) revealed to the player. A combination of these revealed prizes may total to a total prize associated with a particular ticket. The result of each spin may be predetermined as discussed above to provide the overall prize.

As an alternative to each result of each game instance being predetermined, the result of each prize for each instance of the game may be determined dynamically by the client computer. For example, if the overall prize (e.g., $25) for the ticket is known, the client can determine (e.g., randomly) a distribution of winnings of the overall prize among game instances. In the example above, a play of the ticket on one computer could award a $25 prize among two game instances as follows: $5 prize for the first game instance and $20 for the second game instance. Another play of the ticket on the same or different computer may award a $25 prize differently among the two game instances (e.g., $10 for the first game instance, $15 for the second game instance, etc.). It should be appreciated, however, that the game may include any number of game instances, and the prize associated with each game instance may be stored in any storage location (e.g., at the client computer, at the server, etc.).

In another example system, prizes may be awarded in association with each item collected in the game (e.g., a collected item in a poker game). Therefore, prizes may be distributed among hidden items in the game grid as well as being distributed among game instances. As discussed, prize distribution may be stored in a database of the server, may be determined by the client (e.g., randomly), or may be stored at any location or be determined by any manner by the client.

According to another aspect of the present invention, an improved game experience is provided for revealing the result of an online game. As discussed above, a player purchases a ticket or other game piece at a POS or other location. On the ticket, multiple plays of an associated online game are provided with each ticket or other game piece. The player can play those multiple plays across a set of games. For instance, the set of games may include, for example, games of skill and/or chance as discussed above. Certain games may include one or more attempts (or opportunities) for winning prizes. These opportunities for winning may be associated with one or more prizes. For example, a player playing a slot machine may be awarded a certain number of opportunities to play a game (e.g., a game instance (or game play) or other opportunity to win a prize when playing a particular game instance). In the case of a slot machine game, the player may be given a particular number of spins of the slot machine game, and, as a result of each spin, the player may be awarded (or not) a prize. In one embodiment, the result of the overall game is predetermined, and a game experience is determined for each opportunity (e.g., spin) that results in a contribution to the result of the overall game.

According to one embodiment of the present invention, the type of game that is played is immaterial to the outcome revealed to the player. More particularly, the same outcomes associated with a particular ticket may be used to drive multiple types of games. This allows, for example, the gaming operator to offer multiple types of games with a single ticket, and allows the player to select which game(s) to play to reveal the outcomes associated with the particular ticket. For instance, the player may elect to play a slot machine game or other type of game for a first game instance of a ticket, and for a second instance, play a poker game. Of course, it should be appreciated that any type of game and other combinations of games are possible. In this manner, the player may be provided the flexibility to play particular games in which the player is interested, thereby increasing his/her interest and participation in the game. Further, the game operator is provided additional flexibility as new games may be introduced/substituted that are associated with the same ticket or other game piece.

According to one embodiment of the present invention, the outcome of the game is predetermined at the time of ticket printing, issuance, or purchase or shortly thereafter. That is, the game outcome associated with a particular ticket is available prior to, at the same time, or shortly thereafter the ticket is provided to the player, after which time the player is permitted to play any games to reveal the predetermined outcome. In another embodiment, outcomes associated with tickets issued to the player are determined some time after the ticket issuance (i.e., outcomes are "post-determined"). Such is the case with Keno or other drawing-based games wherein game outcomes are determined after ticket issuance. In such a game, players are permitted to obtain the outcome at a predetermined time, usually after the player has purchased the ticket. In one aspect of the invention, it may be beneficial to have a later activation of tickets, especially in the case of a ticket-based game where tickets are issued in some other gaming environment (e.g., a casino). It may be desirable to only permit the player to play such a game outside the gaming environment so as not to compete with other games. Additionally, it may be desirable to require the player to revisit the gaming environment to redeem the ticket and increase the chances that the player will purchase additional tickets or play other types of games offered in the gaming environment.

Also, according to another aspect of the present invention, a first game may be used to reveal the result of a second game. As discussed above, this second game may be one which is already approved by regulators. Such a system may be, for example, a game whose results are driven by a random number generator (or RNG as referred to in the art). One such game is the well-known game of Keno. Another game that may be used is the well-known game of bingo. Other games may be used to drive the result of an online game.

In one example, a Keno game and its associated system are used to generate results which are revealed to a player during play of an online game. To this end, a Keno-based system may be used in conjunction with an online gaming system to present new and interesting online games whose outcomes are driven by results provided by the Keno system. In one particular example, a Keno system provides a correlation of a ticket identifier to a Keno game which is held at some predetermined time. As the Keno numbers are drawn, an outcome is produced that is associated with the particular ticket identifier and is provided to an online gaming system. The online gaming system uses the produced outcome to render a new and interesting gaming experience within an online gaming environment. As discussed, such an environment may include online play of one or more online games of skill, chance, or combination thereof.

According to one embodiment of the present invention, wins are optimized across game instances associated with a ticket. For instance, a ticket may have a predetermined outcome (for example, awarding a prize of $50), that may be allocated across the game instances associated with that ticket. For example, in the case of winning $50 on a 5-play (5 game instances) ticket, it may be desired to allocate the wins across game instances to provide a particular game experience. For instance, the game experience of winning $50 may be distributed across five game instances (e.g., five separate games, respectively winning $5, $0, $0, $5, $40) to provide the player an early indication of winning. Also, the remaining game play of the game instances may be scripted to build the drama of the game experience while still retaining player interest. Such a scripted outcome is more interesting, according to one embodiment, as the player is presented an outcome in a way such that retains interest in the game. This is beneficial, as an overall result includes extending scratch-type games or other type of game experience beyond the point of sale, and beyond the instant (but fleeting) gratification associated with scratch-type or other instant ticket game experiences.

According to one embodiment, a player is permitted to wager and redeem bets at authorized locations (e.g., legal jurisdictions such as lottery retail establishments, casinos, and the like) while the online portion of the game may be played in any locale or jurisdiction. In such a case, the casino or lottery experience is extended to locations where otherwise lottery and/or casino games are not available. Thereafter, players return to the lottery or casino establishment to redeem their tickets thereby providing yet another opportunity to entertain the player.

According to yet another aspect of the present invention, winning results may be split across opportunities to win. One embodiment of the present invention relates generally to how wins are shown to the player across win opportunities. In one specific example, one embodiment relates to a method for revealing wins to a player across a play of multiple game instances that build excitement for the player and which holds the interest of the player in continuing to play the game. It is appreciated that the game experience may be made more compelling if wins are distributed among win opportunities in an interesting way.

Another method for maintaining the interest of players includes awarding additional opportunities to win with each ticket. For instance, one of the prizes awarded with a particular opportunity to win (e.g., during the play of the game instance) may be one or more additional opportunities to win. For instance, in a slot machine game, an issued ticket may be associated with five (5) spins. One of the prizes awarded with the ticket may include additional spins. At the time of initial ticket activation, it may be predetermined that the ticket is associated with these additional opportunities to win, and these additional opportunities may be associated with the issued ticket. The player, when playing the game, will obtain additional satisfaction in playing because the number of game instances to be played by the player are increased, and therefore, their opportunity to win is also increased. This may be beneficial to create a more realistic gaming experience (such as in casino slots) where additional spins may be awarded during casino play. However, unlike casino play wherein slot play can be continued from an online account or by placing additional bets to create a more continuous game experience, the additional spins are awarded to a single ticket.

In the case where an online game system is a Keno-based or other drawing-based systems wherein results are not predetermined, additional opportunities to win may be associated with the ticket in the form of additional numbers selected by a computer system and associated with the ticket at the time of a drawing. This may be performed, for example, by assigning one or more additional drawing entries as a prize itself in the pay table associated with the Keno or other drawing-based game. More particularly, the drawing entries may be awarded as prizes, which themselves are indexes into other entries in the same pay table. Such additional entries may correspond to one or more prizes. For example, when the drawing occurs, the additional plays are awarded to the drawing numbers associated with the ticket. These drawing numbers may be associated with a particular game instance, of which there may be many associated with one ticket. At the point when the ticket is activated by the result of the drawing and play of the online game is permitted, the player, upon the beginning of play of the ticket or a particular game instance, the player is awarded the additional plays (and therefore, any prizes) associated with these additional plays. The additional plays may be played as additional game instances, which themselves have additional reveal opportunities. Alternatively, additional reveal opportunities may be added to one or more other game instances to make game play more exciting.

In another example, additional opportunities to win are awarded to a ticket, but these additional opportunities are awarded for a future game instance. In one example, the game reveals, during a win opportunity (e.g., a spin, a reveal, etc.) in a first game instance, one or more win opportunities within a second game instance. These win opportunities may be redeemed and "added on" to the second game instance, or the win opportunities may be provided as part of a "free play" of an additional game instance. In the case of a game driven by a drawing-based system (e.g., Keno, bingo, etc.), additional win opportunities may be provided for game instances conducted at a later time. For example, in a first game, a player may be provided a "free play" of a game instance to be conducted (or available to be played) at a particular start time. To this end, the player may be provided an additional code that allows the player to play the game at the later time. In the case of a subscription-based system where a player subscribes to play more than one game, the player may have additional plays added to his/her existing subscription.

In another example, an additional opportunity to win a prize may be provided outside of the play of the primary game. Because the opportunity is presented outside of the play of the game, there are several benefits to such a win opportunity. For instance, the player is permitted to lose the primary game even though the ticket associated with the primary game is a winning ticket. In one specific example, the player may be permitted to play the primary game and lose, and have the winning result revealed in the additional win opportunity. Thus, a wider range of games and more realistic games may be offered with such a game format. In one embodiment, the additional win opportunity may be presented to the player in the form of an additional game. In one specific game format, a number selection game may be used as the additional game.

Also, providing such an additional win opportunity allows the primary game to be simplified, as the various permutations of possible results of the primary game need not be designed into the primary game. For instance, a pay table associated with the primary game may not adequately represent all of the possible combinations of game outcomes that may produce a predetermined win result. Thus, the additional win opportunity may be provided to take into account any game outcomes that fall outside of the paytable. Further, the additional win opportunity may be used by a game operator to award prizes to the player outside play of the primary game. For instance, the game operator or affiliated organization may provide, in the additional win opportunity, additional prizes such as, for example, rewards points, coupons, discounts or other promotional items. These items may be awarded with the intent of increasing interest in the game and/or promoting other games, products, and/or services.

In another aspect of the present invention, winnings by a player may be redeemed online to allow the player to play further instances of the online game. For instance, the player, after receiving a prize when playing a particular game instance, is permitted to redeem the prize online. In one type of online redemption, the player is provided one or more additional game instances to be played. To this end, the player may be provided one or more access codes allowing the player to play the additional game instance(s). These additional access codes may be provided to the player in an interface of the game, by e-mail, or other method.

According to another aspect of the present invention, a method is presented for providing players an enhanced gaming experience. According to one embodiment, it is appreciated that it is beneficial to enhance players' interest in playing games, particularly losing ones. In one embodiment, an illusion is presented to players to provide the illusion of being very close to winning a particular game. For instance, in the case of a slot machine, the slot machine result may indicate, in a three-wheel slot machine, that the player received a possible winning combination on the first two wheels, and only with the revealing of the last wheel does the player realize that he/she has lost the game. According to one aspect, it is realized that the losing game experience should compel the player to continue playing the game.

In another example system, prizes may be awarded in association with each item collected in the game (e.g., number of points in a slot machine type game). Therefore, prizes may be distributed among elements or levels during play as well as being distributed among game instances. As discussed, prize distribution may be stored in a database of the server, may be determined by the client (e.g., randomly), or may be stored at any location or be determined by any manner by the client.

According to another aspect of the invention, it is appreciated that conventional methods for playing online games of chance are not secure. In particular, because the result or outcome of the game or predetermined sequence of game states may be encoded on a ticket, the lottery game may be compromised if the winning codes are deciphered. Such a deciphering could occur, for example, by hacking a computer system associated with the online lottery and obtaining a list of winning tickets, or reverse engineering software (e.g., on a PC) where the winning codes or sequence of game states may be stored. Further, it is realized that in such conventional systems, the lottery ticket or the online game software and its data are single points of security failures in the system.

One aspect of the present invention relates to a method for conducting a game of chance. According to one embodiment, a more secure method is provided by which an online game may be played. Instead of placing a game seed that determines a sequence of game states on a ticket (e.g., an instant scratch or lottery ticket), the game states or outcomes may not be placed on the ticket. Rather, the outcomes may be stored in an online database. To this end, a code may be stored on the ticket, the code being used as a decryption key used to find the outcome stored in the database. In particular, there may be a mapping between an outcome code and a corresponding decryption key that is printed on the ticket.

Because the decryption key is placed on the ticket, unauthorized access to the online game is not permitted without the physical ticket. In another embodiment, a portion of the decryption key is placed on the ticket, and another portion is stored in a database associated with the online game. In this manner, security cannot be breached without having both portions of the key (either having the issued ticket portion or the online portion). Thus, a hacker may not compromise a lottery ticket database without the ticket, and, by virtue of having a winning ticket, other winning ticket numbers may not be determined. Access to the online portion of the key may be obtained, for example, by providing some other information (e.g., a serial number printed on the ticket). However, it should be appreciated that the information used to gain access to the online portion of the key need not be printed on the ticket—the information may be provided on some other medium or by another method.

The ticket may be, for example, a scratch-type lottery or "instant" ticket, pull-tab, or type of pre-printed ticket type. Alternatively, the ticket may be a printed lottery ticket as is known in the art, which is a ticket printed at a Point of Sale (POS), usually in the form of a lottery drawing ticket (e.g., PowerBall or other type lottery drawing game). Also, the ticket may be an electronic ticket issued by a computer system. It should be appreciated that the ticket may be any type of ticket issued in any form, and the invention is not limited to any particular ticket type method of issuing a ticket.

According to one aspect of the present invention, a method for playing a game of chance is provided. The method comprises acts of permitting a player to purchase an entry into one or more games of chance, and providing the player an option to use at least a portion of the potential winnings to purchase one or more additional entries in the one or more games of chance. According to one embodiment of the invention, the method further comprises an act of issuing a ticket to a player, the ticket including a code printed on a surface of the ticket, the ticket being associated with a plurality of results. According to another embodiment of the invention, the method further comprises an act of providing for the player to play another game on a different medium than the issued ticket, wherein the plurality of results are revealed to the player. According to another embodiment of the invention, the method further comprises an act of revealing the plurality of results during play of an online game.

According to one embodiment of the invention, the method further comprises an act of determining whether the entry is a winning entry having corresponding winnings, and if so, using at least a portion of the winnings to purchase the one or more additional entries in the one or more games of chance. According to another embodiment, the winnings are predetermined. According to another embodiment, the method further comprises an act of permitting the player to select the option at the time of purchase of the entry into the one or more games of chance. According to another embodiment, the method further comprises an act of associating the option with an identifier of the entry into the one or more games of chance. According to another embodiment, the identifier of the entry is an identifier of a ticket issued to the player at a point of sale (POS).

According to one embodiment, the act of providing the player the option further comprises an act of permitting the player to specify a limit of the purchase of the one or more additional entries in the one or more games of chance. According to another embodiment, the limit is determined, at least in part, as a function of the purchase of the entry into the one or more games of chance. According to another embodiment, the act of using the at least a portion of the winnings to purchase one or more additional entries occurs when the winnings are available. According to another embodiment, the act of using the at least a portion of the winnings to purchase one or more additional entries occurs after the one or more games of chance are played by the player.

According to one embodiment, the one or more additional entries are made in a different game than a game associated with the winning entry and winnings used to purchase the one or more additional entries. According to another embodiment, the one or more additional entries are made in a same game that is associated with the winning entry and winnings used to purchase the one or more additional entries. According to another embodiment, the different game is conducted later than the game associated with the winning entry. According to another embodiment, the method further comprises allocating, within the same game, a plurality of entries corresponding to an option indication determining a number of additional entries to be purchased. Acccording to another embodiment, the method further comprises an act of permitting the player to indicate, within an interface of a computer system, a selection of the option to use the at least a portion of the potential winnings to purchase the one or more additional entries in the one or more games of chance.

According to one embodiment, the method further comprises an act of permitting the player to indicate, on an entry card associated with the entry, a selection of the option to use the at least a portion of the potential winnings to purchase the one or more additional entries in the one or more games of chance. According to another embodiment, the method further comprises an act of conducting an online game, during which, a plurality of results are revealed to the player and wherein the act of conducting the online game includes act of presenting to the player an indication of the option. According to another embodiment, the act of presenting includes an act of displaying the indication in a display of a game-playing computer system. According to another embodiment, the online game includes a slot-machine type game. According to another embodiment the method further comprises an act of providing, by a first server associated with a first game, a result associated with the game of chance. According to another embodiment, the method further comprises an act of storing, in a memory of a computer system, the result associated with the game of chance. According to another embodiment, the method further comprises an act of associating the result with an indication of the ticket.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
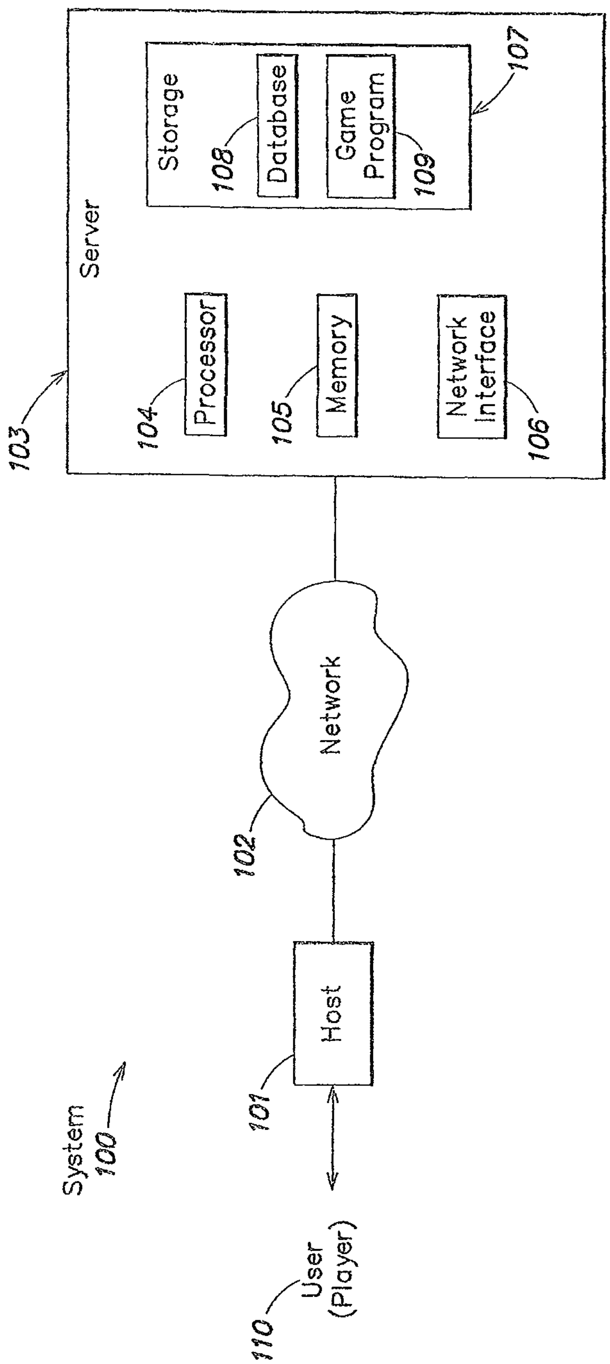
FIG. 1 is block diagram of a system for conducting a game according to one embodiment of the present invention.

A player may purchase a lottery or other type of ticket, to play a primary game (e.g., a slot machine game). In one embodiment of the present invention, the player is permitted to reinvest winnings for more plays of the game. In particular, the player may be to choose how many additional plays to reinvest winnings.

In one example, the primary game result is driven by the result of a secondary game, such as a lottery or casino-based drawing (e.g., a Keno drawing). The secondary game is then played, and any additional plays as a result of the reinvestment are also played. Results of the secondary game and the additional games are sent to an online gaming system. The player is then permitted to play an online game to reveal the results of both the secondary game and any additional plays as a result of the reinvestment. In one example, the cost of the reinvestment is subtracted from any winnings as the additional plays are revealed to the player.

In one example game format, the player may be permitted to select a reinvestment option at the point of initial purchase of the game. The player may be permitted, for example, to limit his/her reinvestment as a function of their initial investment. For instance, reinvestment may be set to a multiple (e.g., 1×, 1.5×, 2×, etc.) the ticket value. So, in the example case where a player purchases 100 plays and selects a 1× reinvestment option, the reinvestment may be limited to 100 additional plays as funded by any winnings received from play of the original 100 plays.

Reinvestment may occur, for example, when the winnings are available for investment. In one example, the winnings may be intermediate winnings that are won through play of a game or series of games. However, the intermediate winnings may be, in total, associated with a single ticket. Thus, as winnings are revealed to the player, the winnings may be reinvested.

Reinvestment may also occur after the total number of intermediate winnings is revealed to the player. For instance, the player may be allocated a finite number of slot machine pulls, and after the playing of all of the pulls, any winnings (or a subset of winnings) are reinvested. The amount of reinvestment may be limited as determined by the player, for example, at the Point of Sale (POS). Various methods for showing the act of reinvesting to the player may be used.

According to one embodiment of the present invention, a secondary game such as a Keno drawing drives the result of the primary game. In this example, reinvestment may occur by preselecting additional sets of Keno numbers according to the reinvestment option selected by the player. In one specific example, if a player pays for 100 plays (e.g., 100 sets of Keno numbers) and selects a 1× reinvestment option, 100 sets of Keno numbers are chosen, along with 100 additional sets of Keno numbers associated with the 1× reinvestment option. The additional sets of Keno numbers are not "paid" for by the player (and therefore the player cannot win any prizes associated with these additional sets) until one or more of the "paid" sets of numbers yields a winning amount that can be applied to the purchase of one or more of the reinvestment sets. Reinvestment sets that are not purchased, according to one embodiment, are voided. Thus, at the end of a particular Keno drawing, results of the "paid" plays and any reinvestment plays are known.

Alternatively, the player may "win" future plays to occur in a future drawing or any other type of game. Such future plays may be, for example, for game sessions at predetermined times following the current game play session. In this manner, the player may continue to play their winnings until the limit determined by the reinvestment option.

Reinvestment may occur, for example, after a single Keno drawing, or in another example, the player may pay to play multiple games that result from associated Keno drawings, which may not necessarily occur at the same time. Thus, plays may be protracted over a period of time, and results of each play may be driven by a separate Keno drawing.

According to one embodiment, the player may indicate the desired reinvestment option at the Point of Sale (POS). This indication may be, for example, be performed by the player by forming a mark on a card similar to those used to enter lottery or Keno-type drawings. To this end, there may be a box or other section of the card that, when filled out by the player, selects the reinvestment option. The card may be scanned by a reader, usually at the POS, and the player pays for the number of bets (e.g., number of plays). As discussed, there may be more than one reinvestment option from which the player may choose.

The reinvestment option may be selected in other ways, such as, for example, in an interface of a computer system. In one example, the player may purchase lottery or other types of tickets using a computer, and the interface may permit the player to select a reinvestment option. For instance, such tickets may be purchased through a kiosk or other type of computer system.

According to one embodiment of the present invention, the player, after purchasing one or more plays of the game, plays the primary game on a computer system. This computer system may be the same or different computer system used to select the reinvestment option. In one example, the computer system includes a display in which an interface of the primary game is displayed. The player plays one or more plays of the game within the interface, and the plays may (or may not) be associated with a winning outcome.

Information relating to the reinvestment option may be transferred to the game-playing computer for the purpose of indicating to the player that the winnings of one or more plays are being (or have been) reinvested into additional plays. The additional plays may be, for example, in the current game being played, or may be additional plays that are played at some point in the future.

The game playing computer may present such information relating to the reinvestment option during or after game play of the "paid" game session. The reinvestment option selected at the POS may be displayed in a section of the display of the game playing computer. A status of the reinvestment play may also be shown to the player. In one example where the player selects a 1× reinvestment option and the player purchases 100 plays, the player may win on one of the 100 plays. Thereafter, the game playing computer may indicate to the player that he/she has won, and some or all of the winnings associated with the play may be reinvested in additional plays. A display of the amount reinvested may be shown to a player. Further, an amount yet to be reinvested may also be shown, if the winnings reinvested do not reach the reinvestment limit selected by the player.

In the example above, if the player wins $25 and the amount of each additional play is $1, then the $25 may be automatically reinvested. However, because the player selected 1×, the game playing computer will reinvest an additional $75, according to one embodiment, if and when the player wins additional games. Thus, the game playing computer may present a status of the reinvestment to the player during game play.

Optionally, the reinvestment may occur after all "paid" games have been played. In such a scenario, the game playing computer may present an indication of the reinvestment after all paid games have been played. To this end, the game playing computer may indicate what winnings were reinvested (e.g., by deducting from indicated winnings awarded from "paid" games) and permitting the player to play the games purchased with winnings from the "paid" game sessions. The game playing computer may indicate the reinvested winnings by, for example, indicating the number of plays remaining as a result of the reinvestment.

According to one embodiment, there may be a special pay table for reinvestment bets. This pay table may be, according to one embodiment, separate from the main pay table associated with the "paid" game sessions. For example, the reinvestment pay table may pay out more or less than the pay table associated with paid game sessions. In one specific example, the pay table may have a similar payout as the paid game sessions, but has a lower hold so that the reinvestment winnings are similar in amount to the paid game sessions. Thus, the reinvestment option may be used as a market retention tool to encourage continued play and return to the POS (e.g., a casino) to redeem winnings.

Although the reinvestment option is attractive for casino-type games such as slot machine-type games, it should be appreciated that such a reveal strategy could be applied to any type of game. For instance, such a reinvestment option may be applicable to a lottery-type game or any other type of game where winnings may be reinvested in further plays.

Figure 2:
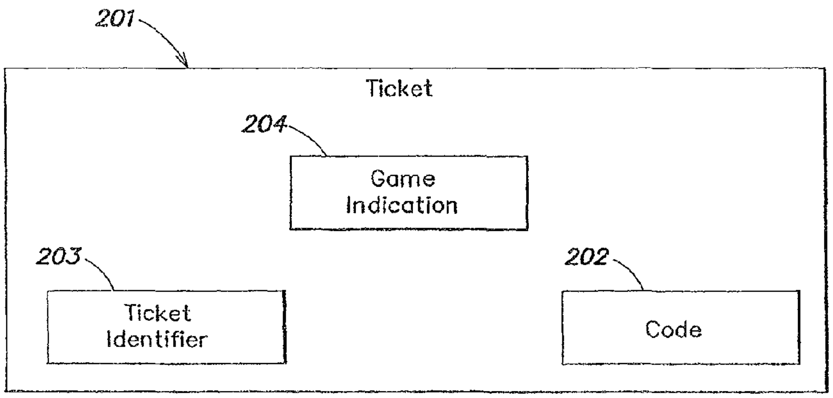
FIG. 2 is an example ticket that may be issued in association with a game according to one embodiment of the present invention.

FIG. 2 shows an example ticket 201 that may be issued to a player in association with a game according to one embodiment of the present invention. The player may scratch a surface of the ticket (in the case of a scratch ticket) to reveal one or more indications. These indications may include, for example, a serial number of the ticket, an access code, or other indication (or combination thereof) that may be used to access the online game. Alternatively, the ticket may be a pull-tab ticket or other ticket type suitable for presenting indications to a player. The ticket may be, for example, a printed ticket that also indicates the election of a reinvestment option. Alternatively, the ticket may be any other ticket type and may indicate (e.g., by a punch hole) that a reinvestment option was selected at the POS.

The ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. Further, as discussed above, the player may be permitted to play any one of a number of offered games, and the player may select different games to play to reveal results associated with game instances. The ticket may be associated with one or more games, and there may be an indications on the ticket to which games (e.g., a slot machine game) the ticket provides access. The ticket may be associated only with a single game (e.g., a single-branded game), or may be indicative of multiple games that can be played.

In one embodiment, ticket 201 includes a code 202 printed on a surface of the ticket that provides access to outcomes (e.g., prizes) stored on the server. As discussed, code 202 may also include, as an optional feature to increase security, a key that may be used to decrypt the outcome. This outcome may be stored in a database stored on a server system. Ticket 201 may also include a ticket identifier 203 used to identify the ticket, and which may be used to identify any outcome(s) associated with the ticket. Further, ticket 201 may include a game indication 204 that relates information relevant to a game played on a computer system. For example, there may also be stored, on the ticket, an identifier that indicates, to the player, the number of plays associated with an online game. The ticket may, optionally, show a reinvestment option selected at the time of purchase. In one example, a player purchases a ticket at a retailer or other POS location.

The player then proceeds to play a game on a computer system. FIG. 1 shows an example system 100 according to one embodiment of the invention upon which a game may be played. The user (a player) 110 plays a game through an interface of a host computer system (e.g. host 101). Host 101 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 103 through one or more communication networks 102. The server may provide a game program 109 that is executed by host 101 for playing the game. More particularly, game program 109, when executed, may provide an online game that can be played by a user through an interface associated with host 101. This online game may be, for example, a video slot machine, blackjack, or other online or casino-type game.

The game program may be stored, for example, in a computer-readable medium (e.g., a memory, storage, or other media) associated with server 103 that provides game programs. For instance, the game program may be stored on a web server and downloaded to a client computer over the Internet. Game program 109 may be one of a number of game programs associated with an online game experience. Different game programs may be selectively downloaded to the client, based on the type of game ticket issued, the game selected for play by the user, the type of client used, or other criteria.

Server 103 may also be a general-purpose computer system, or any other type of computer system capable of authenticating tickets, providing game programs, and performing other game-related functions. Further, it should be appreciated that various game functions may be performed by one or more server systems. Server 103 generally includes a processor 104 for executing server-based game functions. Server 103 may also include a memory 105 for storing data associated with game programs. Server 103 may also include one or more network interfaces 106 that couple server 103 to network 102, which permit server 103 to communicate with one or more hosts. Further, server 103 may include one or more storage entities 107, including disks or other media for storing data. In one embodiment, storage 107 is adapted to store one or more game programs 109 as discussed above. Server 103 may have any number or type of processor that executes an operating system and one or more application programs. In one embodiment, server 103 provides web server content to one or more clients for the purpose of accessing and playing the game.

Server 103 may also include a database 108 that is adapted to store one or more outcomes associated with a ticket or other gaming piece. As discussed, the outcome may be indexed using an identifier of the ticket. Further, database 108 may store information identifying a reinvestment option selected by the player. The reinvestment option may be associated with an identifier of a particular ticket.

Figure 3:
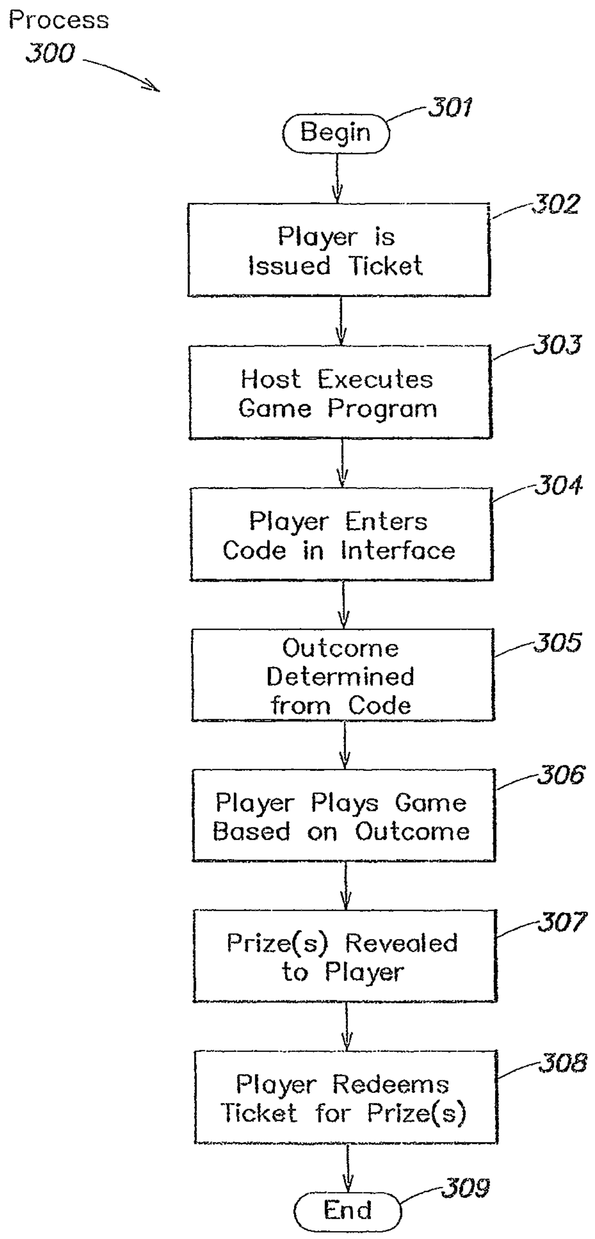
FIG. 3 is a flow chart of a process for conducting a game according to one embodiment of the present invention.

FIG. 3 shows one example process for conducting a game according to one embodiment of the present invention. At block 301, process 300 begins. At block 302, a player is issued a ticket. As discussed, a player may purchase a ticket at a retailer or other POS location. Also, as discussed, the player may elect to reinvest some of his/her winnings in additional plays of an online game. At some later time and/or location, the player may play the online game on one or more computer systems (e.g., a PC or other computer system capable of playing games). For instance, at block 303, a host computer system (e.g., host 101) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG.

2. In one example system, the player accesses a website that includes an interface in which the player may enter the code at block 304.

This interface may be, for example, used to access the game, or may be any other interface (e.g., an interface used to access a download website used for downloading game software (e.g., game program 109)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 305 based on the code. More particularly, there may be a mapping between the code printed on the ticket and an outcome stored on the server. This code may be stored, for example, in a database structure stored in database 108 of the server. Database 108 may be, for example, a relational database, object database, flat file database, or other organizational entities used to store and maintain data. Further a listing of winning codes may be furnished to an organization that provides the game (such as, for example, a state-run lottery commission). The code may, as discussed above, include an optional decryption key that decrypts an entry stored on the server. This entry may indicate one or more outcomes of game instances. This entry may also include an indication of a reinvestment option selected by the player and any additional outcomes to be revealed as a result of playing any additional game instances purchased by the reinvestment.

The outcome of the game is then used by the online game to determine play of the game by the player at block 306. For instance, if the stored outcome is "Win $50," the online game may present an outcome to the player that indicates that the player won a $50 prize. This presentation may be in the form of one or more reveals presented to the player while playing the online game at block 307. The presentation may be progressive, in that the ultimate outcome (e.g., "Win $50") is achieved through a set of reveals or progressions through the online game. For example, in the case where a slot machine game is played wherein points are collected to progress to a second level game, such reveal outcomes presented during the second level game associated with each instance of the slot machine game may be stored on the server, retrieved from the server, and progressively presented to the player. In the case where slot machine game is played wherein reveal outcomes are associated with one or more paylines selected by the player, such reveal outcomes may be presented in an order stored at the server or may be presented in an order based on the number of selected paylines.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

After any "paid" game instances are played, the player may be permitted to play any additional game instances paid for by the reinvestment option. In this way, the player may be permitted to continue the game experience by playing additional game instances with winnings associated with the currently-played ticket.

Once all of the game instances are played, the player may redeem the ticket at the point of sale or other redemption location at block 308. Alternatively, the player may be permitted to redeem the ticket without playing any or all of the games, including any games associated with the reinvestment option. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after ticket purchase. Alternatively, tickets may be redeemed immediately after purchase. At block 309, process 300 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:

Number of Tickets Issued: 2000

Ticket Price: $5

TABLE I

Example Payout Table

| Number of Tickets | Payout |
|---|---|
| 1 | $100 |
| 700 | $10 |
| 500 | $5 |
| 100 | $1 |
| 600 | $0 |

Game Operator Return: $300 (3%)—expenses

As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value.

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g. server 103).

The code stored on the server (e.g., server 103) may be used to determine game play as played on the computer system. For instance, the game outcome may be "Win $50." In the case of a slot machine-type game, the ticket may indicate that the player receives 10 spins of the slot machine. The outcome of each spin may be predetermined, and the game may retrieve information from the server indicating a predetermined sequence of game play as discussed above. In the case of a slot machine-type game, the predetermined sequence may indicate winnings associated with each of the spins, points awarded for each spin (e.g., wherein prizes are not awarded for each spin, but wherein the game experience is still predetermined), and/or an indication of a prize won as a result of playing a second level game (e.g., a prize indicated by a spin of a prize wheel). It should be appreciated that any aspect of game play may be predetermined and associated with the code.

Outcomes associated with game instances purchased using reinvested winnings may be predetermined. For instance, additional spins of a slot machine-type game may be purchased with prizes won by playing "paid" game instances. These additional outcomes may have a predetermined sequence and may be stored on the server (e.g., server 103). Such additional outcomes may be retrieved from the server by a game-playing computer system prior to play.

In another example, only the overall outcome is predetermined (e.g., the total winning associated with the ticket), and the sequence of game play may be determined when the game is played. In the example above where the player is indicated as winning $50 over 10 spins, the $50 winnings (and any intermediate losses) may be allocated to the player at any point over the 10 spins. In the case of any other type of game, winnings may be allocated across game instances. In a further example, winnings may be allocated across items collected while playing a game instance. In yet another instance, winnings may be allocated among any other game element, such as a card, payline, or other element. Because the number of items collected may vary depending on the skill of the player, the distribution of prizes among collected items may be determined during game play by the game playing system. Thus, according to one embodiment, the player's skill (or lack thereof) does not affect the overall outcome of the game.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of "spins," the result of each spin), or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience. Outcomes associated with reinvested winnings may also be determined based on some function (e.g., randomization), determined by a rule-based or formula-based approach, or be predetermined.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a card game, casino game or any other game) that reveals at least a portion of the prize. The underlying prizes available via the reveals may be predetermined, in that the outcome of the game may be stored in one or more systems. The scratch or other type of ticket may reveal different numbers of plays (e.g., pulls in the case of a slot-machine type game, or game instances of any other type of game) the player receives.

In one aspect of the present invention, the ticket includes authentication information that is used to obtain the reveals. In one example, the ticket contains a secret key which is used to decrypt the results that are revealed to the player. That is, according to one aspect, it is impossible to determine if and what a particular ticket wins without having possession of the ticket (and therefore the secret key). In another example, the ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery provider for additional audit control.

Figure 4:
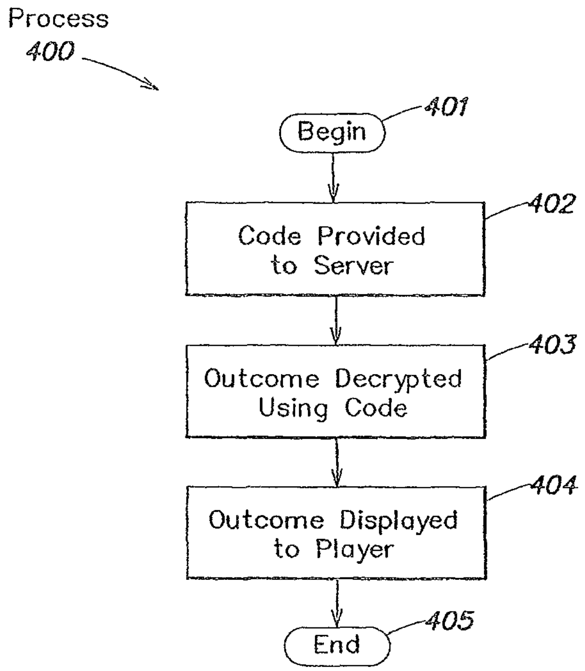
FIG. 4 is a flow chart of a process for conducting a game according to another embodiment of the present invention.

A process for performing secure access to outcomes is shown in FIG. 4. At block 401, process 400 begins. A server (e.g., server 103) may store a number of outcomes in encrypted form, each of which outcomes can be accessed by a respective code. These outcomes may be encrypted, for example, using any encryption method (e.g., symmetric, asymmetric encryption) as is known in the art. At block 402, a code is provided to the server (e.g., server 103).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 403 to decrypt the outcome (or outcome) stored on the server. This code may be any decryption key type that may be used to decode data, and may be of any format or length. The decrypted outcome may then be presented to a player at block 405. The outcome may be displayed using any method. For example, as discussed above, the outcome may be presented through one or more reveals presented to the player during play of an online game. At block 405, process 400 ends.

Another aspect of the present invention relates to a lottery-based software game that can be played over a network, such as the Internet. According to one embodiment, the system includes a purchase of a scratch-based or printed ticket by a player at a point of sale (POS). A POS may be, for example, a place at which lottery tickets may be sold, including convenience stores or other locations where lottery products are provided. In an alternative system provided at a casino or other gaming establishment, a ticket may be sold to a player at the casino for play at a later time. Optionally, the player selects to reinvest some of any potential winnings associated with the game to purchase additional chances to win a prize.

The player receives the ticket at the POS or other location, and proceeds to play a computer-based game at another location to reveal a result (or outcome) of the game. The computer-based game may be, for example, a casino-type game (e.g. slot machine, video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). According to one embodiment, the code is an access key (or a portion thereof) that is used to access one or more results stored on the server. Further, results (stored in the server) may be encrypted. For example, the code may be a private key or a symmetric key. The key may be transmitted by a client computer system to the server for the purpose of decrypting results using SSL or any other secure method.

Because the decryption key is stored on the ticket, the gaming system is safer, as a breach of security of either the tickets or the server does not provide access to result information. More particularly, access to the lottery ticket database may not be accomplished without the ticket (used to decrypt the result). Further, the tickets may not be correlated to results without the lottery ticket database (because the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier printed on the ticket.

The scratch-based or printed ticket also includes a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played. In the case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., a slot machine game, etc.). It should be appreciated, however, that although the game of Keno may be used to drive an online game experience, other games (e.g., bingo) may be used.

In the case where the player selects to reinvest winnings, additional sets of Keno may be chosen associated with the reinvestment option. When the Keno drawing occurs, the result of the "paid" sets of Keno numbers are used to drive the online game along with any results of the reinvestment sets of Keno numbers. When the reinvestment sets of Keno numbers are paid for by winnings from the "paid" sets, results associated with the reinvestment sets are available to be revealed to the player.

The server (e.g., server 103) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 5:
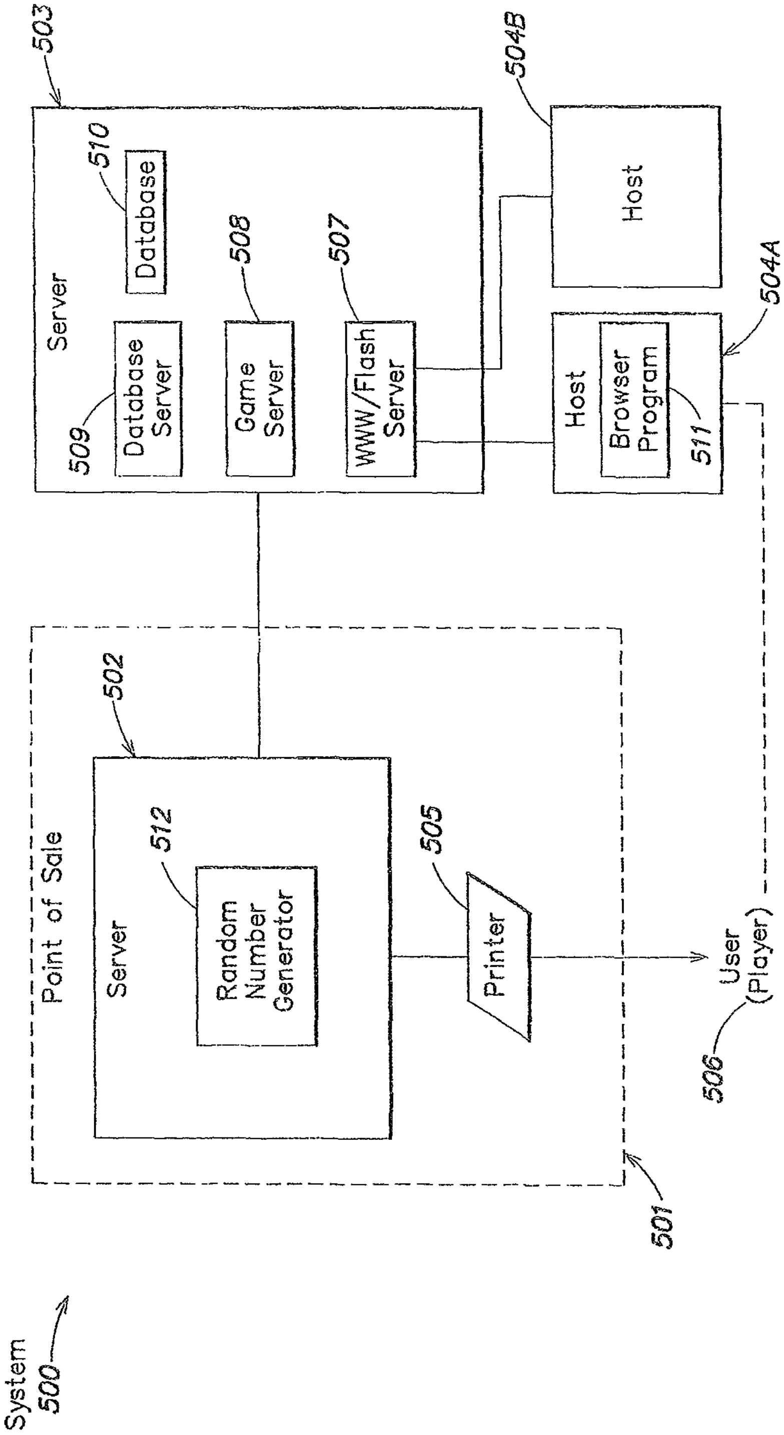
FIG. 5 is a system for conducting a game according to according to one embodiment of the present invention.

As shown in FIG. 5, a system 500 may be provided having more than one server. For instance, a server 502 provided at the point of sale 501 is primarily responsible with issuing tickets to a user/player 506. To this end, server 502 may issue preprinted tickets or may issue tickets printed from an associated printer 505. Such tickets may include one or more identifiers as discussed above with reference to FIG. 2. As discussed, another system such as a Keno or lottery-based system may be used to provide results to an online game system.

In one version of system 500, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 503). Thereafter, clients (e.g., hosts 504A, 504B) access results stored on the server based on their respective access codes. Such results may include, for example, any results of "paid" games/instances and any games purchased through selection of a reinvestment option.

As discussed above, one or more hosts 504A, 504B (e.g., general purpose computer systems) may communicate with a server 503 over a network for the purpose of conducting a game. In one example, a host 504A renders a browser window by executing a browser program (e.g., the Internet Explorer browser program available from the Microsoft Corporation). A user/player 506 enters a URL address specified by an issued ticket in a window of the browser interface, and is directed to a website associated with server 503. This website may be rendered by, for example, a WWW server process (e.g., server 507) associated with server 503.

Player 506 may be instructed to enter an access code (and/or any other required information) to access one or more games in an interface presented through the browser. As discussed, server 503 may validate the received access code, and provide any results stored in a database associated with server 510. Once validated by server 503, the user may be permitted to play one or more games. These game may be, for example, be programmed using one or more programming languages (e.g., Macromedia Flash) and may be downloaded to host 504A and executed.

According to one aspect of the present invention, it may be beneficial to provide a game program that may be downloaded quickly to a client and played by a player without requiring any installation procedure, requiring operator (player) intervention, or delays in downloading large files. To this end, the game program may be programmed in a language supported by a majority of game playing systems (e.g., Macromedia Flash, etc.), and played without the need for downloading and installing large software components. In one specific example, the game program may execute within a browser program (e.g., the Microsoft Explorer browser program) window. In this manner, less-sophisticated players who have difficulty using computers and/or installing software may not be prohibited from playing the game. Of course, it should be appreciated that any programming method may be used that requires or does not require any installation procedure, and the invention is not limited to any particular programming method.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 503). In the case of a drawing that affects outcomes, drawing results can be communicated from server 502 to server 503. In addition, server 502 may maintain a mapping from a ticket identifier (e.g., a serial number) to an access code provided on the ticket, and provide a mapping of outcome to access code when the drawing occurs. As discussed, such outcome information may be maintained in a database 510 associated with server 503 and may be accessed through a database server process 509.

As discussed, the payout of the lottery ticket may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. As discussed, the player may be permitted to select more than one result to be revealed during a single spin of the slot machine (e.g., by selecting multiple pay lines). In this case, the results may still be predetermined, but the outcome of each spin may be adjusted so that the multiple pay line result may be revealed.

In one example of the random method of determining results, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way.

Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately, seconds after, days after, or any predetermined time. For tickets with results dependent upon results of a particular Keno game or other event, the ticket may not be redeemed until after the event has passed.

Finally, after play of the online game, the player is permitted to validate the ticket at any POS location (e.g., 501 (for example, a lottery agent, casino, or other gaming establishment) to redeem his/her winnings as indicated during the online portion of the game. According to one embodiment, players are permitted to redeem their winnings only after playing the online portion of the game. The player, by playing the online portion of the game, sets status information at the server (e.g., server 503). When the player attempts to redeem the ticket at the POS (e.g., 501), the status information may be checked, and the player is permitted to redeem his/her winnings. To this end, server 503 may communicate information back to server 502 relating to game play.

For instance, server 503 may collect information that indicates the sequence of game play performed at the client, and other player tracking information. In one example, tickets may be associated with a particular player, and the player may be awarded loyalty points or other credit for playing the game.

Taking a slot machine game, a player is issued a ticket at a POS to play one or more instances (e.g., spins) of the slot machine game. The ticket indicates an access code, and the player uses this access code to gain access to the system (e.g., from a host coupled to server 503 through the Internet). The player enters the access code in a user interface, and, once validated, is permitted to play the slot machine game. Optionally, the player is permitted to play, based on a single access code (and ticket), any one of a number of games available from server 503. Such an option may allow a player to play different games for each game instance associated with the ticket.

According to one aspect of the present invention, an additional opportunity to win is provided to the player. In one such opportunity, the opportunity is presented outside of the play of the game (e.g., the primary game such as a slot machine game, bingo game, etc.). Because the opportunity is presented outside of the play of the game, there are several benefits to such a win opportunity. For instance, in the case wherein the game is a game of skill, the player's lack of skill during play of the game may not provide a game playing program the opportunity to reveal to the player his/her predetermined prize. For instance, if a player is predetermined to win $5, and the player plays a bingo game wherein the player is required to declare "Bingo," and the player does not declare "Bingo" and therefore loses the game, the game program may not have the opportunity to award the player the $5 winnings associated with the ticket. Also, there may be other situations wherein the game playing program may not have the opportunity to reveal the predetermined prize to the player. Thus, according to one embodiment of the present invention, it may be beneficial to provide an additional opportunity outside of normal game play to reveal a prize to the player.

Further, such an additional opportunity simplifies game development, as the game need not be designed to force a win for the player within normal game play. That is, the player may be permitted to lose even though the predetermined outcome indicates that the player has won the game. As a result, this additional opportunity allows the game operator to provide a game that provides a true game result rather than a fixed result to trigger a reveal to the player.

Also, such an additional opportunity may be beneficial, for example, in providing the predetermined outcome to the player. For instance, in the case where it may be difficult for the game playing program to reveal a particular prize to the player, the game playing program may present such a prize with the additional opportunity. In one example, there may be certain combinations of results that cannot be accounted for by a pay table associated with a game. In a specific example of a slot machine game, a prize remaining to be revealed to the player during a final spin of the slot machine is $7, but there are no pay table entries and no corresponding slot machine game result that can be arranged by the game playing program to provide a $7 win to the player. Thus, rather than reveal the $7 win during the slot machine game (where there is no such pay table outcome), the $7 winnings may be revealed to the player outside the play of the slot machine game. Thus, game development is simplified in that the game need not account for all possible combinations of game play, and all possible combinations of prize awards. In particular, the additional win opportunity allows the game program to account for any difficult game results. Further, the additional win opportunity permits different types of games that do not lend themselves to gaming format to be used as the primary game (e.g., video games, trivia games, etc.).

Further, such an additional win opportunity may be used for awarding other prizes not associated with the game, such as, for example, rewards points, coupons, discounts or other promotional items. For instance, in addition to a prize allocated to a ticket according to a paytable, the game operator may associate an additional prize with the ticket. This association may be performed, for example, in a database of a server (e.g., server 103).

One example of such an additional opportunity may be presented to the player as a separate or a "second chance" game. This separate game may be played in addition to the primary game (e.g., one played on a computer system to reveal the result of the primary game). This game may take the form of a side bet or wager that is played along with the primary game. So, in the example above where the player fails to receive a predetermined outcome in the primary game (e.g., a slot machine game, bingo game, or any other type of game), the side bet is arranged to provide the additional outcome.

The following is a specific example of a separate game that may be played along with a primary game. For instance, the separate game may be a number matching game (e.g., a daily number-type game) where the player chooses numbers and the numbers are compared to a set of numbers drawn by the game playing computer system. For example, the selected number may be a four-digit or other length number. In one example game format, the player may be permitted to choose numbers prior to play of the primary game. Alternatively, the game program may automatically assign the numbers to the player (e.g., in a random manner such as a quick pick). The player may be presented the opportunity to select numbers or have the game playing computer select numbers for the player. The player then plays the primary game (e.g., a slot machine game, bingo game, or any other type of game) in which the player is presented one or more win opportunities.

In one example, the player is predetermined to win a prize (e.g., $5). The game playing system may provide an opportunity for a $5 win during the game, but the player fails to activate the win opportunity (e.g., by losing the game, by not calling "Bingo" in time, etc.). In one example, the game playing system does not force a win for the player (e.g., by fixing results of a game, instance, or win opportunity within the game). Rather, the player loses the game and/or fails to activate the win opportunity.

In one specific example second chance game using selected numbers, at the end of the game, the game playing system may cause the player's selected numbers to be displayed, then the system magically draws four numbers (e.g., similar to a keno-style draw), and the person obtains matches equivalent to the $5 win.

In another example system, when playing multiple games per session, the selected numbers may be valid for all games played in the session. Optionally, the player may be permitted to change the selected numbers for each game. Such a change may be performed using a control in the game interface. Further, the selected numbers may be displayed to the player in a predetermined area in the game interface.

Although a number drawing may be used, other second chance games may be used. For instance, the player's numbers may be applied to a safe or other container type combination. If the safe opens, the player wins the prize revealed by its opening. In another example, the container may not contain (or reveal) a prize.

Figure 6:
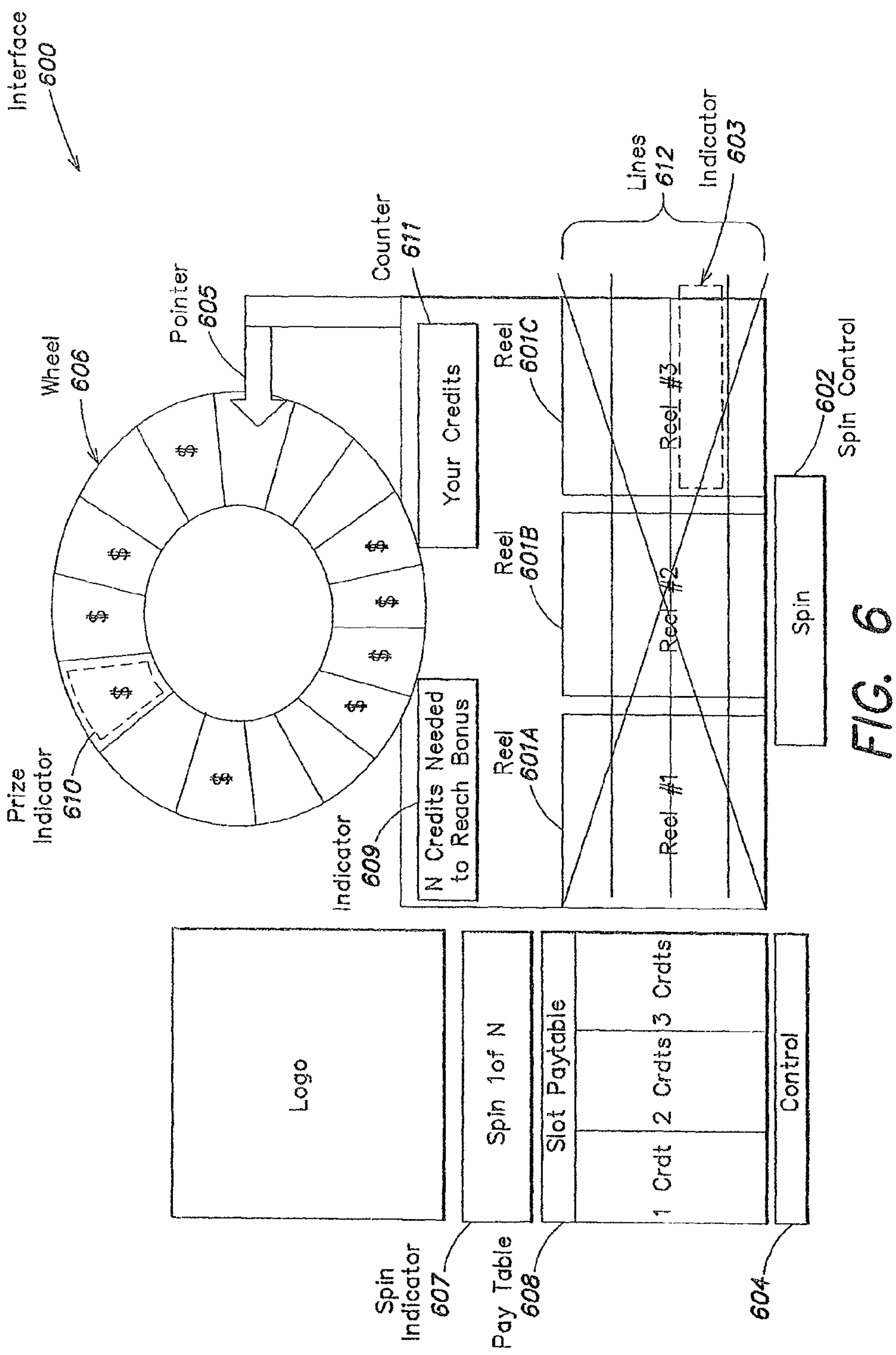
FIG. 6 is a game interface according to one embodiment of the present invention.

FIG. 6 shows an example game interface 600 according to one embodiment of the present invention. According to one embodiment, the game includes at least two levels, the first of which includes a slot machine-type game. According to one embodiment of the present invention, the slot machine-type game is presented to the player by a computer system in an interface 600. In particular, in a display of a computer system upon which the game is played, a slot machine representation may be rendered in interface 600, with the slot machine having reels having one or more indicia (e.g., indicator 603) located on one or more reels (e.g., items 601A-601C). The indicia may be, for example, characters, items, or any other type of elements suitable for use in a slot machine.

A set of indicia across the reels (e.g., reels 601A-601C) along one or more lines (e.g., lines 604) may correspond to a combination of indicia that are matched to points in a pay table (e.g., pay table 608). The pay table may indicate, for instance, a correlation between combinations of indicia and awarded point (or credit) totals. In one example above, such indicia may include types of fruits, when matched in a particular combination, yield a particular award. If the indicia across one or more lines match that indicated by the pay table, the player may be awarded a corresponding number of points indicated by the pay table.

The slot machine representation may also include a spin control 602 which may be any type of control (e.g., a button, level, etc.) that, when activated, causes the slot machine reels to spin. Further, interface 600 may also include a spin indicator 607 that indicates the number of spins remaining for the player. As discussed, the player may be awarded a finite number of spins to accumulate points. Thus, interface 600 may include a counter 603 that indicates the current number of accrued points or other credit won by the player. Also, interface 600 may include an indicator 609 that shows the number of points or credits needed to progress to the second level game.

Optionally, interface 600 may include a status of a reinvestment option selected by the player. For instance, the interface may indicate whether a reinvestment option was selected at the time of ticket purchase, along with an indication of the status of the reinvestment (e.g., how may additional plays purchased, how many plays yet to be purchased, etc.).

The type and layout of the slot machine is not limited to the type and layout shown in FIG. 6. Rather, it should be appreciated that the slot machine may be any type and layout, and the invention is not limited to any particular slot machine.

The slot machine game ends when the player achieves enough points or other credit to proceed on to the second level game, or when the player runs out of spins. As an additional option, a player may bypass play of the slot machine game by selecting control 604 within interface 600. Selection of element 604 may cause the slot machine game to end. Optionally, selection of element 604 may allow the player to progress to the second level game.

As discussed, credits may be accumulated in the first level of the game and when a predetermined number of credits is attained (or the player selects control 604), the second level game is activated. According to one embodiment, the outcome of the second level game determines whether the player wins a prize.

The second level of the game may include a wheel (e.g., wheel 606) or other indication capable of indicating whether a prize has been won (or not) by the player. The second level game may or may not be shown within the same interface as the first level game. The interface of the second level game may include an indication (e.g., prize indicator 610) of available prizes, which may be placed on sections of a wheel 606. The wheel is spun, and the wheel stops on a particular prize indicator which indicates the prize won for that particular game instance associated with the first and second level game instance. The prize won may be shown by a pointer 605 that points to a particular prize indication on wheel 606.

According to one embodiment of the present invention, the second level game may not always be attained from play in the first level. Rather, play in the first level may be bypassed by the player, and the player may be permitted to play in the second level. In one example second level game, player does not have choice in proceeding to second level play. In another embodiment, the player is not provided a choice in continuing first level play.

According to one embodiment of the present invention, the player does not make choices in the second level play. That is, the prize wheel or other indication has no other inputs other than the indication to begin the second level of play. The second level of play may be initiated, for instance, upon receiving an indication from the first level game that a particular point or credit total is achieved.

According to one embodiment of the invention, the first level game does not have any prize associated with it. More specifically, credits accrued in the first level game cannot be translated into a payout from the first level game. Rather, the play of the first level game determines when and if the second level game is played. According to one embodiment, the result of the second level alone determines whether a player wins, ties or loses a particular game instance.

After play of the second level game, game play is returned to another instance of the first level game (e.g., the slot machine). The player may, however, choose to play a different game (e.g., a card game or other game) at the conclusion of any particular game instance. In the case of the slot machine game, a game instance may be concluded after the end of the second level game. According to another embodiment, the play of each game instance is independent of all other game instances. According to another embodiment, the outcome of a particular game instance is predetermined.

According to one aspect of the present invention, it is realized that the time at which tickets are activated (and therefore, may be played) is important. In the case of a casino-based game, where tickets are issued at the casino, it may be beneficial to include a delay between the purchase of a ticket and a possible redemption of the ticket so that the game play associated with the ticket does not compete against other games offered by the casino (e.g., floor games). For example, in the case of a slot machine game, it may be preferable that such a game be activated after the player leaves the casino, or otherwise is not playable while in the casino so as not to compete with other types of slot machine games or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one aspect of the present invention, the result of the second level game (e.g., a prize wheel result) may be predetermined, whereas the first level game result (e.g., result of each individual spin) is determined using some random number generator (or RNG). In this manner, the player is provided a predetermined result, but the game play that occurs in the first level game is a random number-generated experience which is more similar to actual play in a casino or other online gaming experience. However, because it may be desired to expose more players to the second level game (which may not be reached in a pure RNG experience), it may be beneficial to provide a predetermined (or scripted) outcome for at least a portion of the first level game so as to allow the player to proceed to the second level game.

According to one embodiment, a player is only permitted to play one instance of the second level game. In this case, the player uses provided spins to reach the second level game, and once reached, the player is provided a single result associated with the game. Any spins remaining after the player reaches the second level game are lost. After play of the second level game, the online portion of the game is over.

Alternatively, the player may be permitted to play further instances of the slot machine game, with each level of the slot machine game leading to a second level wherein prizes are revealed. These intermediate prize amounts that are revealed with each instance of the slot machine game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the slot machine game may accumulate to form the $50 prize. There may be a finite number of combinations based on the number of game instances to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, the points awarded for particular combinations of indicia of the slot machine game may be changed according to the spin number so as to increase the game "drama" to maintain player interest. For instance, as the spin number is increased, the points awarded for a particular combination of indicia may also increase. In another example, particular paylines may also be increased or activated based on the spin number, providing an increased level of excitement for the player.

According to one embodiment of the present invention, a slot machine game is conducted that may include the following additional aspects, either alone or in combination:

- The slot machine game may include three reels.
- Each reel of the slot machine comprises three spots, for a total of nine spots visible.
- There may be provided, with a particular ticket, a finite number of spins (e.g., 15 spins).
- Credits are earned according to a slot paytable (e.g., 1 credit, 2 credits, 3 credits) which may be varied based on the spin number.
- Particular paylines may be activated according to the spin number.
- The player selects a control (e.g., a spin button) that causes the reels to spin. At the same time, a pay line is highlighted indicating it is the active pay line for the current spin.
- Only matches on the active pay line for a particular spin can receive any points.
- The pay line remains highlighted until the reels stop spinning.
- If a match is made on an active pay line, the line flashes yellow and the corresponding section of the pay table (e.g., a points table that associates combinations to points) flashes to indicate the match made.
- If a player meets a particular credit threshold (or predetermined number of points), a prize wheel game is activated.
- A counter presented to the player increments the total value of the points earned.
- In one example, there are a total of five active pay lines.
- In another example, the slot machine game cycles through pay lines (e.g., as shown in FIG. 6) in the following order:
  - Middle across
  - Bottom across
  - Top across
  - Diagonal from the top left corner
  - Diagonal from the top right corner
- The prize wheel either lands on a prize or indicates that no prize has been won.
- If the credit threshold is reached, the slot machine game ends and the player is taken to the second level game.
- If the player selects a particular control (e.g., a button) in the game interface, the slot machine game ends, and the player proceeds to the second level game.
- When the player accrues 1000 points, a screen drops down over the slot machine portion of the game. The player is informed they will be proceeding to second level game (e.g., they will be spinning the prize wheel).
- As soon as 1000 points are earned, the user is taken to the second level game. In one example game, there is only one instance of the second level game. In this example, any unused spins are lost when the player proceeds to the second level game.
- If a player fails to accrue 1000 points with the spins allotted, the game ends.
- The second level game is a prize wheel that, when spun, indicates that a cash amount or other prize type is won, or indicates that no prize is awarded.
- The player selects a control to start the prize wheel to spin.
- Each segment of the wheel includes a dollar value or other prize indication on the segment.
- Whatever segment the wheel stops on, the player wins that dollar amount or other prize indication as a prize.
- At the conclusion of the game, the player is presented an indication that the second level game is over and an indication of any prize(s) awarded.
- In one example, no one point award associated with a spin provides enough points to proceed to the second level game by itself.
- In another example, no one slot indicia provides enough points to proceed to the second level game by itself.
- In yet another example, no one slot combination (e.g., three of a kind) provides enough points to proceed to the second level game by itself.
- In a game where the number of pay lines and the number of credits are increased with increased spin number, it is ensured that the last (e.g., the $15^{th}$ spin of 15 total spins associated with the ticket) spin cannot take a player from zero credits to enough credits to proceed to the second level game.

- In another example, the payout of prizes is not tied to the number of spins provided in the first level game, or the number of credits or points accrued in the first level game.
- The initial ticket issued may be used at a redemption center for claiming any awarded prize(s).
- In another example, the result of any of the first level game may be determined by an RNG and odds at the moment of play, or may be determined at the time that a lottery ticket is printed.
- The overall result (e.g., payout) of purchasing a ticket may be predetermined (as in a scratch or other type of instant lottery game0 or may be determined by a later event (such as a lottery or Keno draw).

Figure 7:
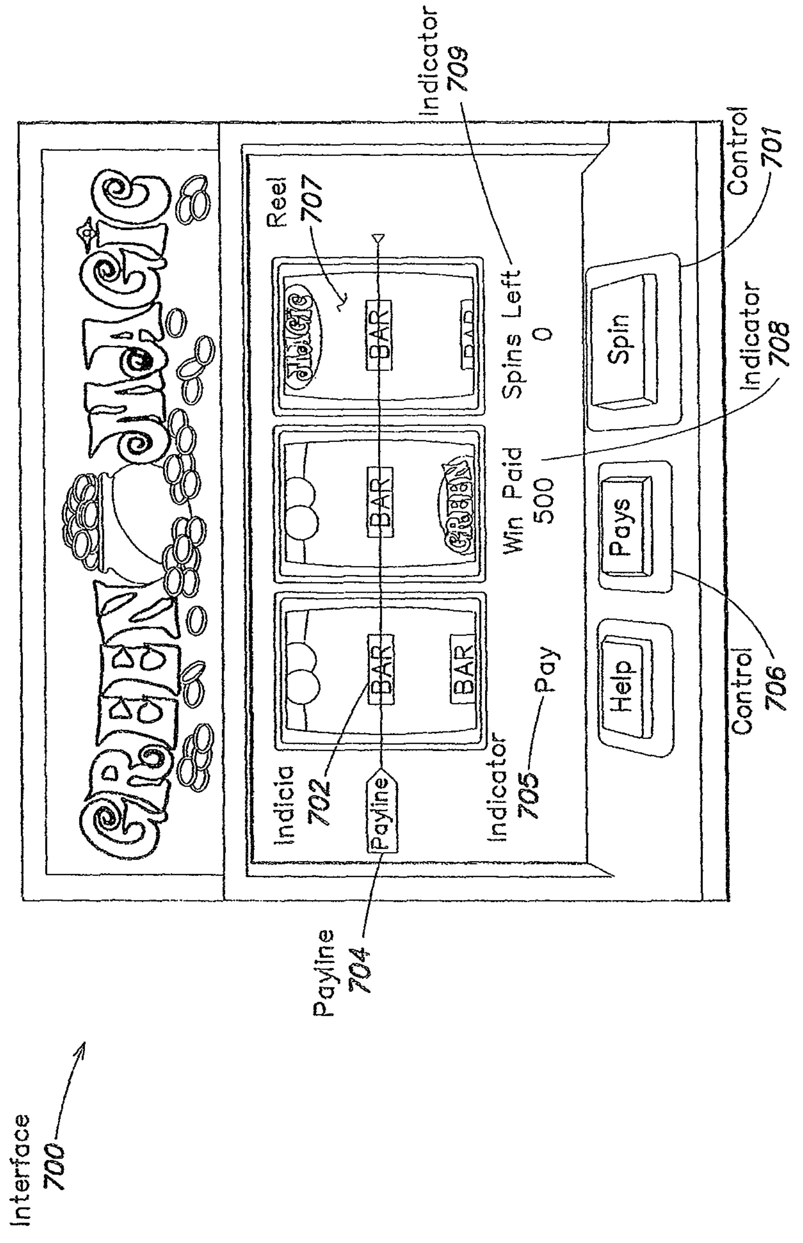
FIG. 7 is a game interface according to another embodiment of the present invention.

According to one embodiment, the game includes a single-level game, such as a slot machine-type game. Prizes may be awarded to the player in one or more game instances of this single-level game. FIG. 7 shows one example game interface 700 representing a single-level game in accordance with one embodiment of the present invention. More particularly, the slot machine-type game is presented to the player by a computer system in an interface 700. In particular, in a display of a computer system upon which the game is played, a slot machine representation may be rendered in interface 700, with the slot machine having reels having one or more indicia (e.g., indicia 702) located on one or more reels (e.g., reel 707). The indicia may be, for example, characters, items, or any other type of elements suitable for use in a slot machine.

A set of indicia across the reels along one or more lines (e.g., payline 704) may correspond to a combination of indicia that are matched to points in a pay table (not shown). Although the slot machine shown in FIG. 7 shows three (3) reels, it should be appreciated that the number of reels used may be any number. The pay table may indicate, for instance, a correlation between combinations of indicia along one or more paylines and one or more prizes. In one example, such indicia may include elements, when matched in a particular combination along a particular payline, yield a prize. If the indicia across one or more lines match that indicated by the pay table, the player may be awarded a corresponding prize indicated by the pay table.

The slot machine representation may also include a spin control 701 which may be any type of control (e.g., a button, level, etc.) that, when activated, causes the slot machine reels to spin. Further, interface 700 may also include a spin indicator 709 that indicates the number of spins remaining for the player to play. As discussed, the player may be awarded a finite number of spins to win prizes. Thus, interface 700 may include an indicator 708 that indicates the current amount of accrued winnings won by the player. Also, interface 700 may include an indicator 705 that indicates whether the current spin result translates to a win for the user according to entries in the pay table.

In one embodiment, the first level game includes a pay table that associates combinations achieved in the slot machine game to prizes won. For instance, particular outcomes as represented in the pay table may be associated with a winning combination appearing on a selected pay line. More particularly, if a combination achieved along a selected pay line matches an entry in the pay table, the player wins the corresponding prize indicated by the pay table. If not, the player does not win any prize associated with that game instance (or selected pay line).

The type and layout of the slot machine is not limited to the type and layout shown in FIG. 7. Rather, it should be appreciated that the slot machine may be any type and layout, and the invention is not limited to any particular slot machine.

The slot machine game ends when the player runs out of spins. As an additional option, a player may bypass play of the slot machine game by selecting a control (e.g., a "QUIT" button, not shown) within interface 700. Selection of such a control may cause the slot machine game to end and reveal any results (e.g., any prizes associated with the game to be awarded to the player).

As discussed, prizes may be awarded in the first level game. In one example, one or more win opportunities may be associated with the first level game. The win opportunities may be revealed to the player when, for example, a particular reel outcome is achieved, a winning combination is achieved along one or more pay lines, a particular point total is achieved, or other aspect is achieved in any of the game, either collectively or individually. Also, in interface 700, there may be an indicator that shows the player any prizes he/she may have won during play of the first level game. As discussed above, results of win opportunities may be stored in a server and downloaded to a game-playing computer system prior to play of the game, may be determined dynamically by the game-playing computer system, or may be determined in any other manner.

Figure 8:
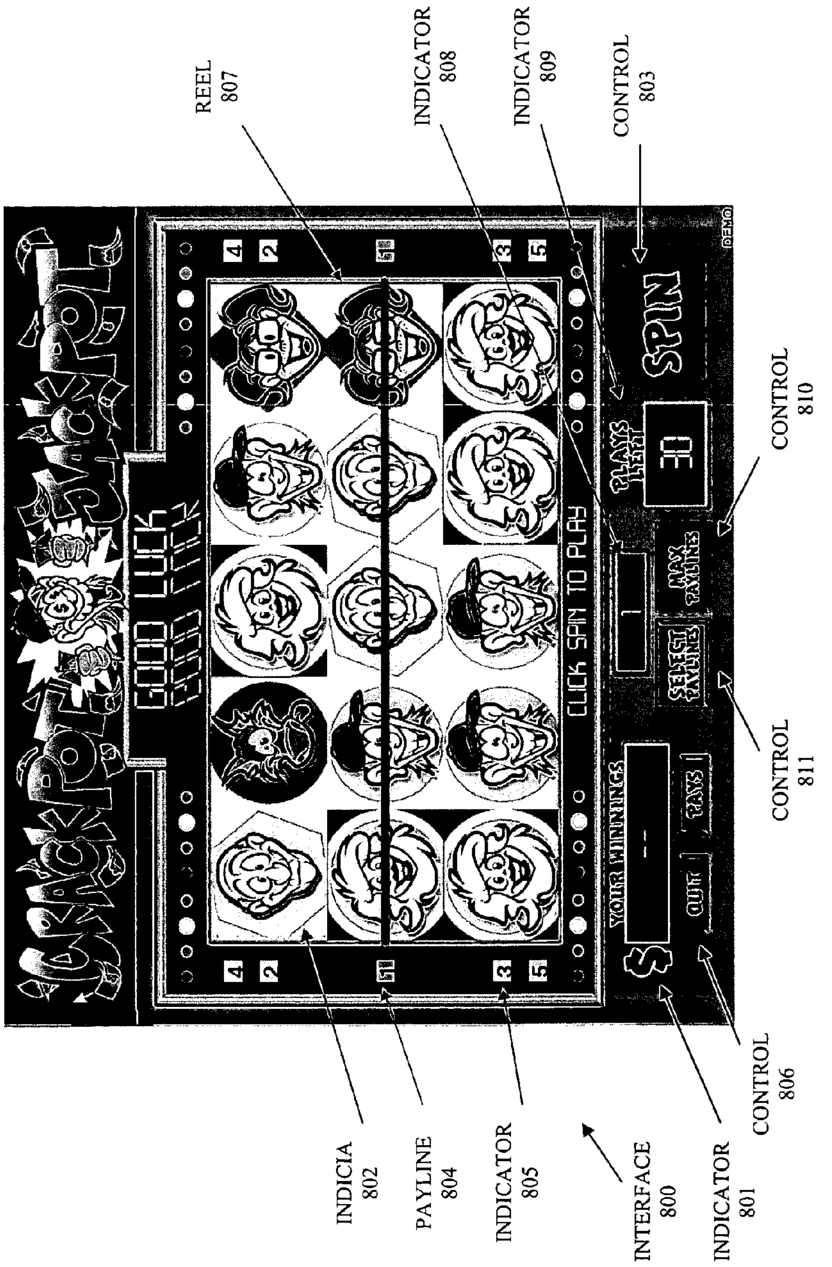
FIG. 8 is a game interface according to another embodiment of the present invention.

As discussed above, the player may be permitted to select on or more paylines each of which may be associated with a win opportunity presented to the player in a single spin of a slot machine game. FIG. 8 shows one example interface 800 that permits selection of multiple paylines. According to one aspect of the present invention, the player is permitted, within an interface (e.g., interface 800) to select one or more pay lines in the slot machine game. Upon selection of a "spin" control, it is revealed whether the selected paylines include a winning combination. Thus the player has some control of how quickly the game reveals the predetermined outcomes.

Interface 800 may also include a representation of a single-level game, such as a slot machine-type game. Prizes may be awarded to the player in one or more game instances of this single-level game. The slot machine-type game is presented to the player by a computer system in an interface 800. In particular, in a display of a computer system upon which the game is played, a slot machine representation may be rendered in interface 800, with the slot machine having reels having one or more indicia (e.g., indicia 802) located on one or more reels (e.g., reel 807). The indicia may be, for example, characters, items, or any other type of elements suitable for use in a slot machine.

A set of indicia across the reels along one or more lines (e.g., payline 804) may correspond to a combination of indicia that are matched to points in a pay table (not shown). Although the slot machine shown in FIG. 8 shows five (5) reels, it should be appreciated that the number of reels used may be any number. The pay table may indicate, for instance, a correlation between combinations of indicia along one or more paylines and one or more prizes. In one example, such indicia may include elements, when matched in a particular combination along a particular payline, yield a prize. If the indicia across one or more lines match that indicated by the pay table, the player may be awarded a corresponding prize indicated by the pay table.

The slot machine representation may also include a spin control 801 which may be any type of control (e.g., a button, level, etc.) that, when activated, causes the slot machine reels to spin. Further, interface 800 may also include a spin indicator 809 that indicates the number of spins remaining for the player to play. As discussed, the player may be awarded a finite number of spins to win prizes. Thus, interface 800 may include an indicator 801 that indicates the current amount of accrued winnings won by the player. Also, interface 800 may include an indicator (not shown) that indicates whether the current spin result translates to a win for the user according to entries in the pay table.

In one embodiment, the first level game includes a pay table that associates combinations achieved in the slot machine game to prizes won. For instance, particular outcomes as represented in the pay table may be associated with a winning combination appearing on a selected pay line. More particularly, if a combination achieved along a selected pay line matches an entry in the pay table, the player wins the corresponding prize indicated by the pay table. If not, the player does not win any prize associated with that game instance (or selected pay line).

Also, interface 800 may include additional controls and indications relating to the selection of paylines by the player. For instance, interface 800 may include an indicator 808 that indicates the current number of paylines chosen. Interface 800 may also include controls (e.g., controls 810, 811) for selecting paylines. In particular, control 811 (e.g., a button) may be selected by the player to select one or more paylines. In one specific example, the player, by progressively selecting control 811, may progressively select multiple paylines. That is, with each selection of control 811, an additional payline may be selected. The player may revert back to the selection of a single payline, for example, by cycling the number of selected paylines (e.g., by selecting an additional payline after the maximum number of paylines have been selected).

Another selection control 810 may be provided that permits the selection of a maximum number of paylines within the slot machine game. More particularly, when selected, control 810 may select the maximum number of paylines available to be played in the current slot machine game instance.

Figure 9:
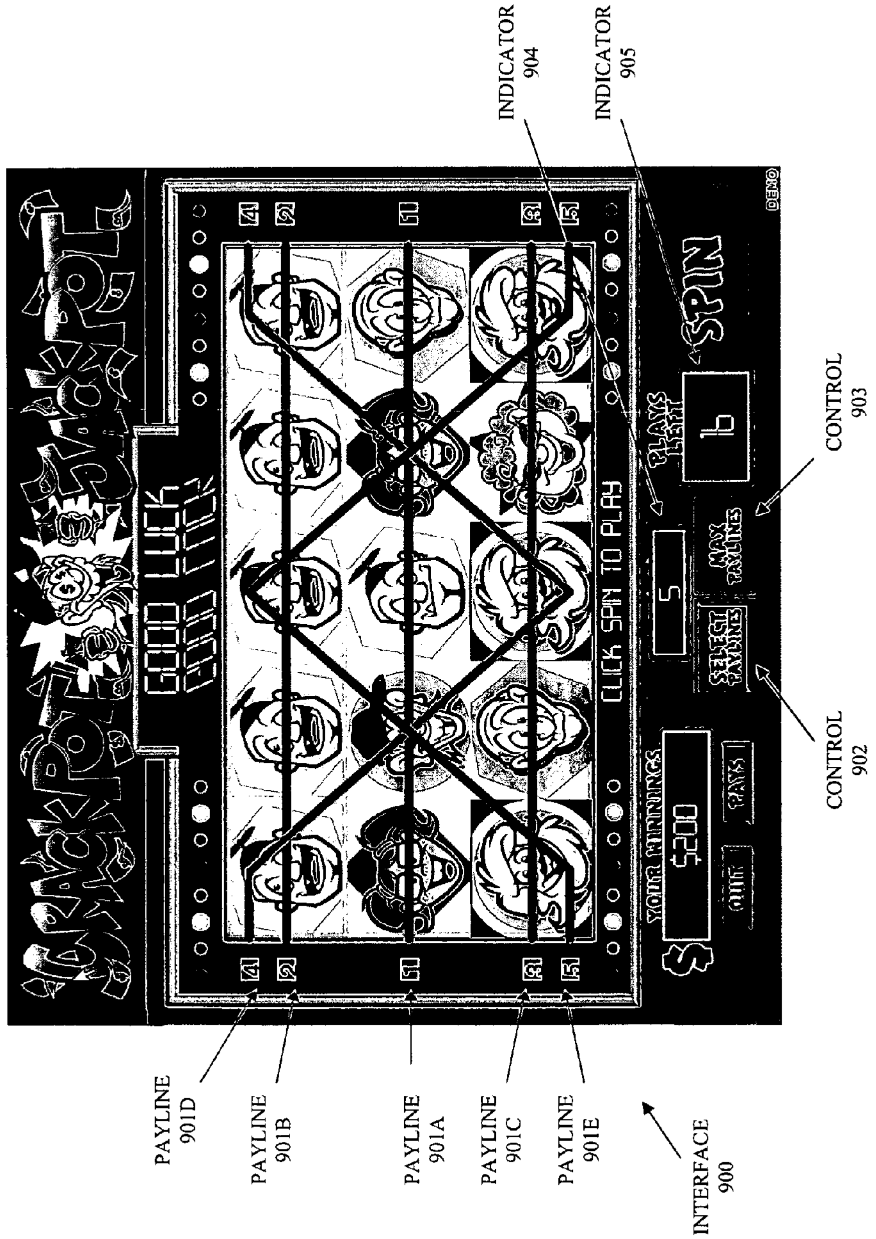
FIG. 9 is a game interface according to yet another embodiment of the present invention.

FIG. 9 shows an example interface 900 including selection of more than one payline (e.g., selected paylines 901A-901E). For instance, interface 900 may include multiple paylines from which the player may choose to play within any particular game instance. In the example shown in FIG. 9, the interface may include five (5) paylines that may be selectively chosen by the player (e.g., using controls 902, 903). It should be appreciated, however, that the game may include any number of paylines, and that the invention is not limited to the number of paylines shown.

According to one embodiment of the present invention, if more than one payline is chosen, the number of "spins" or game instances to be played may be reduced, thus permitting the player to selectively control the overall length of the game. In one example, the number of paylines chosen (e.g., as shown by indicator 904) may reduce the number of remaining spins (e.g., as shown by indicator 905) by an equal amount. However, it should be appreciated that the number of spins may be reduced by any other ratio.

In one example, different paylines may have higher payouts, and thus the player may wish to choose multiple paylines with the prospect of winning a higher-level prize. However, according to one embodiment, the result of playing a particular game instance presented to the player may be adjusted to account for the selection of multiple paylines. More particularly, a game program that presents the result may dynamically determine a result that agrees with the selected paylines, and may dynamically allocate winnings among the selected paylines. As discussed, the overall result of the game may be predetermined, and the game program may allocate portions of any overall winnings to different paylines. Such an allocation may be performed, for example, based on a set of rules, in a random manner, etc.

The type and layout of the slot machine is not limited to the type and layout shown in FIGS. 8 and 9. Rather, it should be appreciated that the slot machine may be any type and layout, and the invention is not limited to any particular slot machine.

The slot machine game ends when the player runs out of spins. As an additional option, a player may bypass play of the slot machine game by selecting a control (e.g., a "QUIT" button) within interface 800, 900. Selection of such a control may cause the slot machine game to end and reveal any results (e.g., any prizes associated with the game to be awarded to the player).

As discussed, a player may be permitted to select one or more paylines to receive an outcome of a win opportunity. According to one aspect of the present invention, the player is presented an indication of a "near miss", in that one or more paylines selected is close to a winning pay line (e.g., the player selected the wrong pay line). As it is understood that the player may select any pay line within the first level game, prizes associated with unselected pay lines revealed to the player upon selection of the final pay line may be varied to create the indication of the near miss. For instance, the game playing system may determine a presentation of one or more prizes in an unselected pay line so that the player feels that he/she lost by a narrow margin (e.g., by selecting the wrong pay line). Rather, the outcome of the selection according to one embodiment is predetermined. That is, the player may select any pay line(s) and still obtain the same result.

The revealed prize distribution among the pay lines presented to the player may be different, however, depending on the pay lines chosen by the player. In this manner, the player feels as if the pay lines (and therefore their corresponding prizes) are predetermined, and that their selection of a particular pay line had an affect on the outcome of the first level game. However, the player's selection has no affect on the outcome of the first level game according to one embodiment of the present invention.

After play of a particular game instance, game play is returned to another game (e.g., a first level game such as a slot machine game). The player may, however, choose to play a different game (e.g., a card game or other game) at the conclusion of any particular game instance. The player may be permitted to play further instances of the slot machine game, with each slot machine game being capable of revealing any awarded prizes. These intermediate prize amounts that are revealed with each instance of slot machine game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the slot machine game (or each spin, card, or other game element with which a win opportunity may be associated) may accumulate to form the $50 prize. There may be a finite number of combinations based on the number of game instances or other game element to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, it is realized that the time at which tickets are activated (and therefore, may be played) is important. In the case of a casino-based game, where tickets are issued at the casino, it may be beneficial to include a delay between the purchase of a ticket and a possible redemption of the ticket so that the game play associated with the ticket does not compete against other games offered by the casino (e.g., floor games). For example, in the case of a slot machine game, it may be preferable that such a game be activated after the player leaves the casino, or otherwise is not playable while in the casino so as not to compete with other types of slot machine games or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one embodiment of the present invention, a slot machine game is conducted that may include the following additional aspects, either alone or in combination:

According to one embodiment, the slot machine game includes a basic slot machine representation presented in a computer interface, the game having realistic sounds and animation of the slot machine reels.

In another example, the slot machine game includes a traditional-looking paytable having odds of winning similar to conventional slot machine games.

In one example, the slot machine may include three or more (e.g., five) reels, having one or more paylines.

In one specific example game format, the active payline may always include the center payline.

Upper and lower portions of the reels (e.g., indicia appearing above and below the center payline) may be presented in the interface. These upper and lower portions may be used in other paylines (e.g., in other rows, or in paylines that traverse rows). Indicia shown in these portions (e.g., icons) may be shown differently than indicia shown in the center payline (e.g., icons may be half visible). Icons or other indicia shown in these portions may be animated to show the reels spinning when the spin control is selected.

One or more paylines may be selected by the player for play in any particular spin of the slot machine game.

In one example, the slot machine game is a single-stage game without bonus rounds and/or bonus games.

According to one embodiment, the paytable may include any number of paylines.

However, in one specific example, a paytable may be used that includes up to 15 entries. If less than 15 paylines are used, the winning combination table may be adjusted to reflect the decreased number of paylines. However, padding may be used (e.g., 13 entries for a 15-line paytable).

The game includes an interface in which the user selects a control (e.g., a lever, button, etc.) to make reels spin.

Within the interface, the game includes an indication that identifies when a player receives a win on a particular payline.

The game interface may also include an indication of how many spins are remaining for the player to play.

According to one example simplified game format, the game does not support split wins. However, other example game formats may support split wins.

In another game format, the game presents a near-miss when presenting a losing outcome. For example, in a three-reel slot machine game, a near miss may be represented by the first two reels stopping on icons or other indicia that are part of a winning combination, but the indicia of the third reel does not complete the winning combination. In another example, weightings may be used (real and simulated) to simulate near-misses and provide a more compelling game experience.

There may be a predetermined number of icons (e.g., eight (8)) used in the slot machine game. In one example, there may be common icons between different game versions (e.g., casino and lottery versions), but there may be specific branded versions of icons unique to the game version. In one example, the unique icon represents the top-winning pay combination. In another example, the unique, game-themed icon animates when the icon forms part of a winning outcome. In another example, other icons may animate when they are part of a winning outcome. In yet another example, priority of animating the icons includes starting with the highest value on the pay table and working down.

The paytable may be accessible to the player via a button on the game interface.

In another example game format, the order that the icons appear in the payline need to match the order depicted in the paytable.

In one specific example, the slot machine game may include a 5×3 video slot machine game. The 5×3 video slot machine game may include fifteen "cells" in which indicia (e.g., icons) can be presented. A payline may be formed using any set of cells. For example, a payline may be formed in rows or columns of the cells, or may traverse between cells of any row or column. According to one example game format, there may be multiple, intersecting paylines that are active within a particular "spin." In a 5×3 video slot game, there may be a larger number of icons (e.g., twelve (12) icons) used in the game.

In another example format, with each play of a game instance, the player is provided a fixed number of spins of the slot machine. The player can use one spin at a time or use multiple spins simultaneously (e.g., activating more than one payline at a time).

When the user is out of spins, the game is over.

In one specific example, the game may store a counter that tracks the number of plays N that are provided to the player. As the player selects paylines, the number of plays is decreased based on the number of paylines chosen. By selecting more paylines within a particular spin, the number of plays N can be decreased more quickly (and the number of "spins" played by the player are therefore decreased). When the counter N equals a value of zero, the game is over.

In one example game, a control may be provided to select paylines. In one specific example, the control may include a button that cycles through the available paylines each time it is pressed. More particularly, each time the button is pressed, an additional payline is selected. In one specific game format, there may be at least one default payline that is used for each spin. Optionally, there may be an indicator that shows the number of paylines selected.

In another example game format, another control may be provided that, when activated, selects all available paylines within a particular slot machine game. In another example format, selection of the control causes the reels to spin.

Depending on the number of paylines selected, a value presented by the spin indicator is decreased by an appropriate amount (e.g., by the number of paylines selected).

When a prize is won, a prize indicator is presented to the player that accumulates prizes won during play of the game, along with an indicator of any current prizes won. In one example, a free spin may be one of the prizes won, and if this is the case, the spin indicator value is increased by the number of spins awarded to the player.

At the conclusion of the game, the player is presented an indication that the game is over and an indication of any prize(s) awarded.

Figure 10:
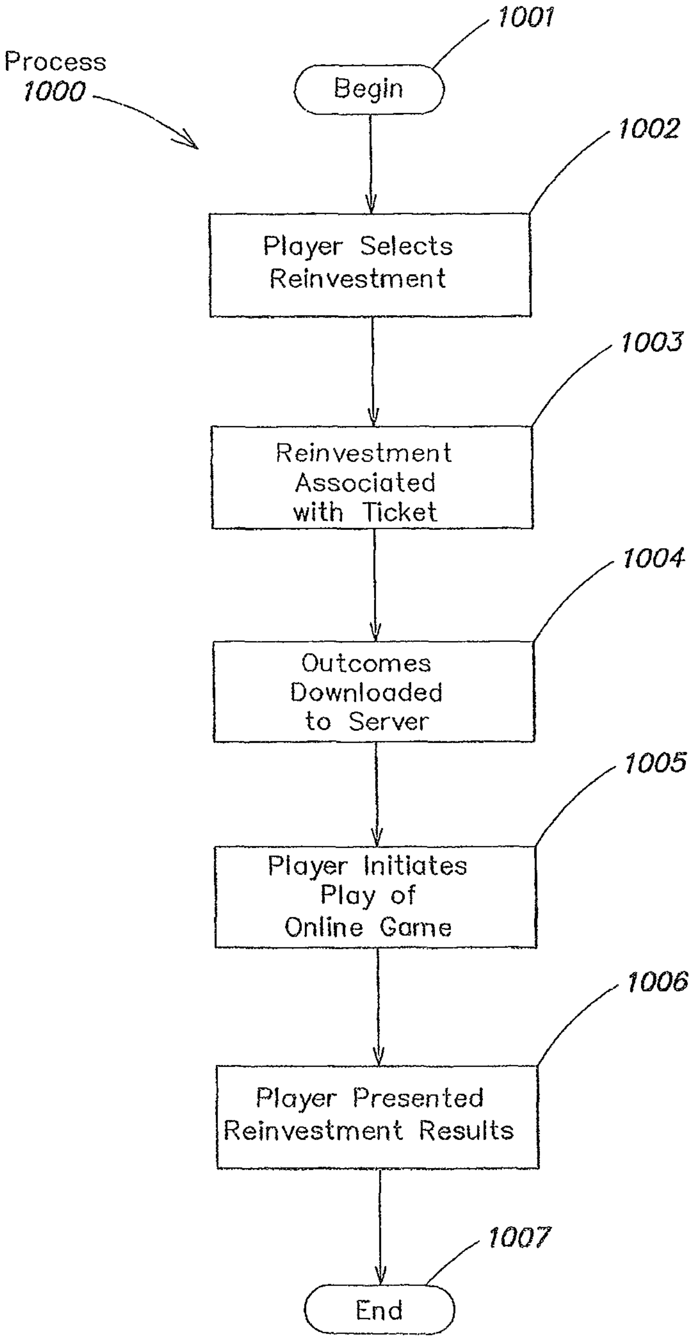
FIG. 10 is a flow chart of a process for reinvesting winnings according to one embodiment of the present invention.

FIG. 10 shows an example process 1000 for reinvesting winnings according to one embodiment of the present invention. At block 1001, process 1000 begins. As discussed, a player may purchase one or more plays of an online game (e.g., a slot machine-type game). The player may be presented, at the time of purchase, an option to reinvest winnings in one or more additional plays. At block 1002, the player selects an option to reinvest at least a portion of the winnings from the "paid" games to purchase one or more additional plays. As discussed, there may be more than one reinvestment option presented to the player.

After the player selects the reinvestment option, the option is associated with the ticket purchased by the player at block 1003. This may be accomplished, for example, by associating the option with a serial number or other identifying information of the ticket. At block 1004, outcomes of the "paid" games and the reinvestment games are made available to a game server, after which the player may play the online portion of the game in which results are revealed. In the case of a Keno-driven system, a Keno system may draw numbers and send results of the draw to the game server. These results may indicate, for example, which game instances have won, how much was won, etc.

At block 1005, the player may initiate play of the online game (or series of games). As the player plays each game instance, there may be one or more opportunities for the player to win a prize. In one embodiment of the present invention, winnings are reinvested when prizes are indicated during play. For instance, if the player purchases 100 plays for \$100 (\$1 per play) and a 1× reinvestment option, and during one of the paid plays the player earns \$10, that \$10 is "reinvested" and 10 additional plays are automatically purchased. An indication of the reinvestment may be presented to the player within the interface (e.g., an increase in the amount of spins in a slot machine game).

After the player plays through the "paid" games, the player may be permitted to continue playing any games purchased as a result of the reinvestment option. These games may be the same underlying game (e.g., Keno drawing) that drives the result of the online game, or the games purchased through reinvestment may be different games. Thus, the player is permitted to extend the gaming experience in a similar manner to other types of games (e.g., casino games). Results of the games purchased through reinvestment may be presented to the player at block 1006. At block 1007, process 1000 ends.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for playing a game of chance on a distributed computer system comprising acts:

permitting a player to purchase, at a point of sale (POS), an initial entry into a first game played by the player on the distributed computer system;

determining whether the initial entry is a winning entry;

providing the player an option, at the time of purchase of the initial entry, to designate at least a portion of the potential monetary winnings to automatically purchase one or more additional entries into a second game when prizes are indicated during game play, wherein the winnings are predetermined prior to providing the option;

in response to purchasing the initial entry into the first game, issuing a ticket to the player comprising the first game, the first game comprising a single-player game of chance, the ticket including a code printed on a surface of the ticket, the ticket being associated with a plurality of results;

providing, after play of the first game, for the player to play the second game online via the distributed computer system, wherein the second game comprises a multi-player game of skill, and wherein play of the first game does not affect play of the second game; and revealing, after play of the first game, the plurality of results of the first game during play of the second game.

2. The method according to claim 1, further comprising an act of associating the option with an identifier of the entry into the first game.

3. The method according to claim 2, wherein the identifier of the entry is an identifier of the ticket issued to the player at the point of sale (POS).

4. The method according to claim 1, wherein the act of providing the player the option further comprises an act of permitting the player to specify a limit of the purchase of the one or more additional entries in the second game.

5. The method according to claim 4, wherein the limit is determined, at least in part, as a function of the purchase of the entry, including but not limited to cost of the initial entry, into the first game.

6. The method according to claim 1, wherein the act of using the at least a portion of the winnings to purchase one or more additional entries occurs when the winnings are available.

7. The method according to claim 1, wherein the act of using the at least a portion of the winnings to purchase one or more additional entries occurs after the first game is played by the player.

8. The method according to claim 1, wherein the one or more additional entries are made in a same game that is associated with the winning entry and winnings used to purchase the one or more additional entries.

9. The method according to claim 8, further comprising allocating, within the same game, a plurality of entries corresponding to an option indication that determines a number of additional entries to be purchased.

10. The method according to claim 1, wherein a different type of game is conducted later than the game associated with the winning entry.

11. The method according to claim 1, further comprising an act of permitting the player to indicate, within an interface of a computer system, a selection of the option to use the at least a portion of the potential winnings to purchase the one or more additional entries in the second game.

12. The method according to claim 1, further comprising an act of permitting the player to indicate, on an entry card associated with the entry, a selection of the option to use the at least a portion of the potential winnings to purchase the one or more additional entries in the second game.

13. The method according to claim 1, further comprising an act of providing, by a first server associated with the first game, a result associated with the game of chance.

14. The method according to claim 13, further comprising an act of storing, in a memory of a computer system, the result associated with the game of chance.

15. The method according to claim 14, further comprising an act of associating the result with an indication of the ticket.

* * * * *